(12) United States Patent
Eidelman et al.

(10) Patent No.: US 11,024,464 B2
(45) Date of Patent: Jun. 1, 2021

(54) HERMETICALLY SEALED SURFACE MOUNT POLYMER CAPACITOR

(71) Applicant: VISHAY ISRAEL LTD., Petach Tiqwa (IL)

(72) Inventors: Alex Eidelman, Beer Sheva (IL); Pavel Vaisman, Omer (IL); Yuri Stangrit, Beer Sheva (IL); Yongjian Qiu, Greenville, SC (US)

(73) Assignee: VISHAY ISRAEL LTD., Petach Tiqwa (IL)

( * ) Notice: Subject to any disclaimer, the term of this patent is extended or adjusted under 35 U.S.C. 154(b) by 61 days.

(21) Appl. No.: 16/115,021

(22) Filed: Aug. 28, 2018

(65) Prior Publication Data
US 2020/0075264 A1    Mar. 5, 2020

(51) Int. Cl.
| | |
|---|---|
| *H01G 9/10* | (2006.01) |
| *H01G 9/012* | (2006.01) |
| *H01G 9/028* | (2006.01) |
| *H01G 9/00* | (2006.01) |
| *H01G 9/15* | (2006.01) |
| *H01G 9/26* | (2006.01) |

(52) U.S. Cl.
CPC .............. *H01G 9/10* (2013.01); *H01G 9/0029* (2013.01); *H01G 9/012* (2013.01); *H01G 9/028* (2013.01); *H01G 9/15* (2013.01); *H01G 9/26* (2013.01)

(58) Field of Classification Search
CPC .......... H01G 9/15; H01G 11/78; H01G 11/82; H01G 11/74; H01G 11/76; H01G 9/10; H01G 9/012; H01G 9/028; H01G 9/0029; H01G 9/26

USPC ....... 361/523, 522, 328, 528, 531, 536, 538, 361/540

See application file for complete search history.

(56) References Cited

U.S. PATENT DOCUMENTS

| | | |
|---|---|---|
| 3,795,844 A | 3/1974 | Markarian |
| 3,956,819 A | 5/1976 | Augeri |
| 4,987,519 A | 1/1991 | Hutchins et al. |
| 6,238,444 B1 | 5/2001 | Cadwallader |
| 6,380,577 B1 | 4/2002 | Cadwallader |
| 6,560,089 B2 | 5/2003 | Miltich et al. |
| 6,594,140 B1 | 7/2003 | Evans et al. |
| 6,707,660 B1 | 3/2004 | Evans et al. |
| 6,791,821 B1 | 9/2004 | Monnett |

(Continued)

FOREIGN PATENT DOCUMENTS

WO      2014/039545 A1    3/2014

*Primary Examiner* — Arun Ramaswamy
(74) *Attorney, Agent, or Firm* — Volpe Koenig

(57) ABSTRACT

A hermetically sealed polymer capacitor and a method of forming the same are disclosed. The method preferably includes dispensing an amount of conductive paste inside a case and inserting one or more capacitor elements into the conductive paste. The conductive paste may surround sides of the one or more capacitor elements. Optionally, a bushing may be placed on the one or more capacitor elements. The bushing may have one or more holes that allow one or more positive leads coupled to the one or more capacitor elements to pass through. A cover is preferably welded to the opening of the case. The capacitor assembly is preferably dried to evacuate moisture from inside the case. The one or more positive leads are preferably welded to one or more metal tubes of a glass to metal seal (GTMS) in the cover to seal the capacitor assembly.

20 Claims, 24 Drawing Sheets

(56) References Cited

U.S. PATENT DOCUMENTS

| | | |
|---|---|---|
| 6,807,048 B1 | 10/2004 | Nielsen et al. |
| 6,850,405 B1 | 2/2005 | Mileham et al. |
| 6,859,353 B2 | 2/2005 | Elliott et al. |
| 6,952,339 B1 | 10/2005 | Knowles |
| 7,274,551 B1 | 9/2007 | Parler, Jr. et al. |
| 7,983,022 B2 | 7/2011 | O'Connor et al. |
| 8,086,312 B2 | 12/2011 | Nielsen et al. |
| 8,094,434 B2 | 1/2012 | Rawal et al. |
| 8,238,079 B1 | 8/2012 | Knowles |
| 8,259,435 B2 | 9/2012 | Millman et al. |
| 8,339,769 B2 | 12/2012 | Schott et al. |
| 8,405,956 B2 | 3/2013 | Dreissig et al. |
| 8,451,586 B2 | 5/2013 | Priban |
| 8,477,479 B2 | 7/2013 | Pease et al. |
| 8,576,544 B2 | 11/2013 | Rawal et al. |
| 8,605,411 B2 | 12/2013 | Biler et al. |
| 8,687,347 B2 | 4/2014 | Bates et al. |
| 9,070,512 B2 | 6/2015 | Breithaupt et al. |
| 9,076,592 B2 | 7/2015 | Masheder et al. |
| 9,105,401 B2 | 8/2015 | Dreissig et al. |
| 9,786,441 B2 | 10/2017 | Lin et al. |
| 9,947,479 B2 | 4/2018 | Eidelman et al. |
| 2003/0088293 A1 | 5/2003 | Clarke et al. |
| 2004/0225327 A1 | 11/2004 | Norton et al. |
| 2005/0195558 A1 | 9/2005 | Goldberger et al. |
| 2006/0018083 A1 | 1/2006 | Schmidt |
| 2006/0023400 A1 | 2/2006 | Sherwood |
| 2006/0087795 A1 | 4/2006 | Nagasawa et al. |
| 2006/0291140 A1 | 12/2006 | Kazaryan et al. |
| 2008/0232029 A1 | 9/2008 | Ning |
| 2008/0247122 A1 | 10/2008 | Vaisman et al. |
| 2009/0122470 A1 | 5/2009 | Matsuoka et al. |
| 2010/0175235 A1 | 7/2010 | Nielsen et al. |
| 2010/0268292 A1 | 10/2010 | Eidelman et al. |
| 2010/0297495 A1 | 11/2010 | Casby et al. |
| 2012/0033349 A1* | 2/2012 | Petrzilek ................ H01G 9/012 |
| | | 361/525 |
| 2012/0087062 A1 | 4/2012 | Kurita et al. |
| 2012/0106029 A1 | 5/2012 | Galvagni et al. |
| 2012/0127632 A1 | 5/2012 | Evans et al. |
| 2012/0257327 A1 | 10/2012 | Zednickova et al. |
| 2012/0257329 A1 | 10/2012 | Biler et al. |
| 2013/0095299 A1 | 4/2013 | Evans |
| 2014/0061284 A1* | 3/2014 | Hussey .................. H01G 13/00 |
| | | 228/176 |
| 2014/0104755 A1 | 4/2014 | Hagiwara et al. |
| 2014/0254066 A1 | 9/2014 | Rustomji et al. |
| 2014/0268499 A1 | 9/2014 | O'Phelan et al. |
| 2014/0335394 A1 | 11/2014 | Krehl et al. |
| 2015/0004478 A1 | 1/2015 | Prinzbach et al. |
| 2015/0127060 A1 | 5/2015 | Eidelman et al. |
| 2015/0179349 A1 | 6/2015 | Biler et al. |
| 2017/0125178 A1* | 5/2017 | Perez .................... H01G 11/28 |
| 2017/0140876 A1 | 5/2017 | Eidelman et al. |

* cited by examiner

HERMETICALLY SEALED SURFACE MOUNT POLYMER CAPACITOR

FIELD OF THE INVENTION

The following description is directed to an improved capacitor and method of making an improved capacitor. More specifically, the present invention is directed to a method of manufacturing a hermetically sealed capacitor with improved performance.

BACKGROUND

Hermetically sealed capacitors have found use in applications where environmental conditions are detrimental to capacitor performance. In general, a hermetically sealed capacitor may include a capacitive element having a valve metal anode with a dielectric thereon and a conductive layer on the dielectric. The capacitive element may be hermetically sealed in a casing.

Whereas wet capacitors may utilize an electrolyte solution as the cathode conductor, hermetically sealed solid electrolytic capacitors may use a solid conductor, such as $MnO_2$ or an intrinsically conducting polymer, as the cathode conductor. In recent years, intrinsically conductive polymers such as poly 3,4-ethylenedioxythiophene (PEDT) have been used as the preferred cathode conductor in electrolytic capacitors due, in part, to their high electrical conductivity and benign failure mode.

SUMMARY

A hermetically sealed polymer capacitor is disclosed. The hermetically sealed polymer capacitor preferably includes conductive paste inside an interior of the case. One or more capacitor elements are preferably at least partially surrounded by the conductive paste. The conductive paste may surround a bottom and a portion of sides of the one or more capacitor elements. A cover is preferably welded to the case as a first part of a hermetic seal. One or more metal tubes of one or more GTMS preferably allow one or more positive leads coupled to the one or more capacitor elements to pass through. The one or more metal tubes are preferably insulated from the cover via glass of the one or more GTMS. The one or more positive leads are preferably welded to the one or more metal tubes to form a second part of the hermetic seal, such that a moisture content within the case is less than approximately 25% relative humidity at approximately 20° C. to approximately 30° C.

In another aspect, a method of forming a hermetically sealed polymer capacitor is disclosed. The method preferably includes dispensing an amount of conductive paste inside a case. The case is preferably formed with an anode end, opposite cathode end, lower side, first lateral side, upper side, and second lateral side. The anode end is preferably formed as an open end or opening. One or more capacitor elements are preferably inserted into the conductive paste through an opening in the case. The conductive paste may surround at least portions of the one or more capacitor elements, such as surrounding a bottom and a portion of sides of the one or more capacitor elements. A cover is preferably welded over the opening of the case to close off the anode end of a capacitor assembly. One or more glass to metal seals (GTMS) preferably allow one or more positive leads coupled to the one or more capacitor elements to pass through the cover while remaining insulated from the cover. The capacitor assembly is preferably dried to evacuate moisture from inside the capacitor assembly. The one or more positive leads are preferably welded to metal tube portions of the one or more GTMS to seal the capacitor assembly.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
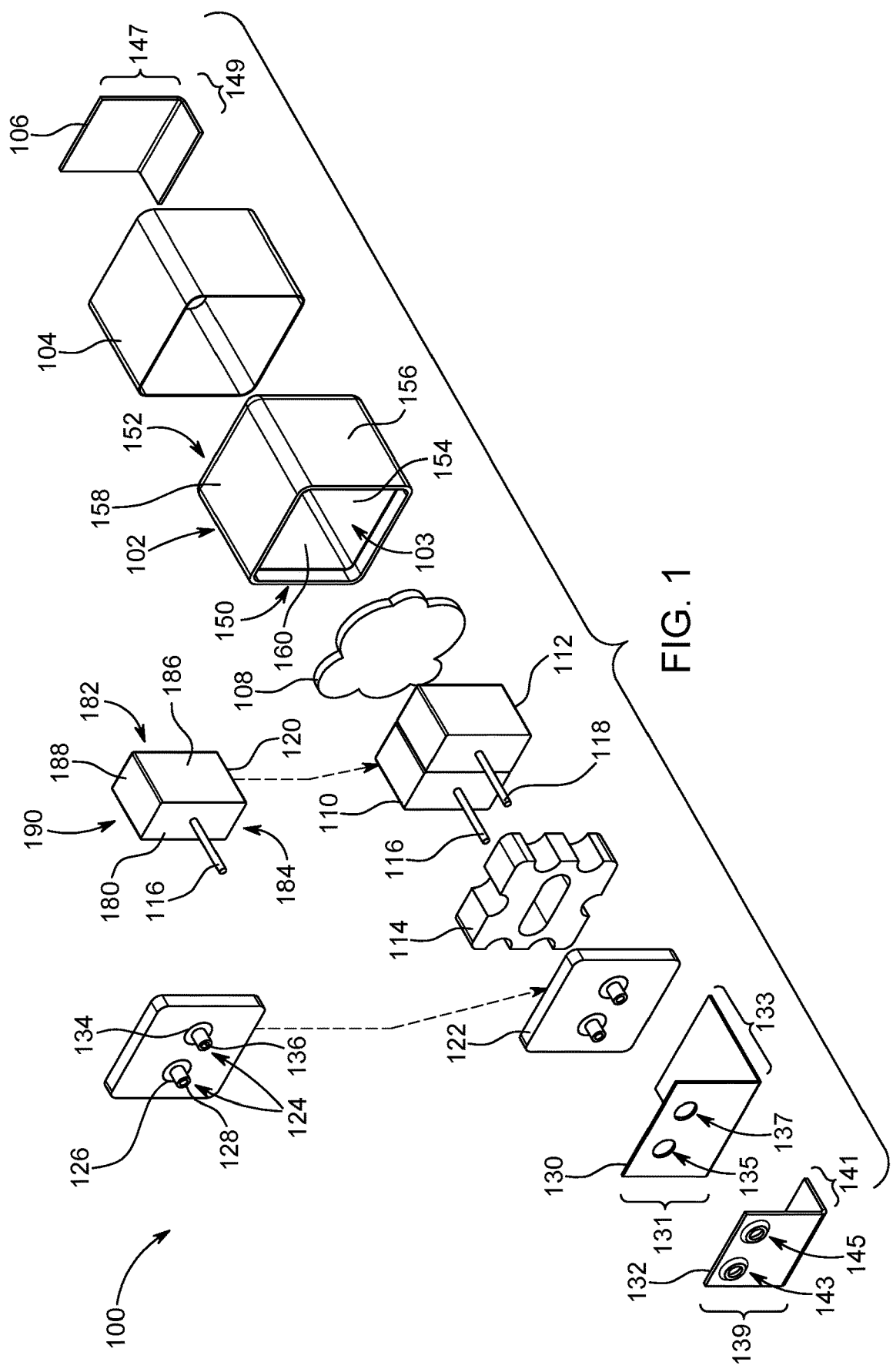
FIG. 1 is an exploded diagram illustrating components of a hermitically sealed polymer capacitor.

Examples of different capacitors and various implementations thereof will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "top" or "bottom" or "below" or "above" or "upper" or "lower" or "horizontal" or "vertical" are used herein to describe a relationship of one element, layer or region to another element, layer or region as illustrated in the Figures. It will be understood that these terms are intended to encompass different orientations of the device in addition to the orientation depicted in the figures.

The following description is directed to a hermetically sealed solid polymer capacitor (HSPC) and methods for manufacturing the same. The hermetically sealed solid polymer capacitor may deliver high capacitance values and low Equivalent Series Resistance (ESR) in harsh environments (e.g., high temperature and/or high humidity). The proposed hermetically sealed solid polymer capacitor may have a small footprint, may be surface mountable, and may have a high capacitance and low ESR (e.g., in the range of tens of mΩ) as comparatively to traditional hermetically sealed capacitors.

The hermetically sealed polymer capacitor preferably includes a hermetic metal package, or capacitor assembly, with positive and negative terminals located on opposite sides of the package. One or more capacitor elements are preferably positioned inside the hermetic metal package and electrically connected in parallel. The multiple capacitor elements are preferably one or more sintered tantalum slugs. The one or more sintered tantalum slugs are preferably electrochemically oxidized to create tantalum pentoxide dielectric layer and then covered with electrically conductive polymer layers.

A conductive element such as a tantalum lead wire may protrude from the sintered tantalum slug and is preferably connected to an anode terminal of the capacitor. The one or more multiple capacitor elements may preferably be attached to an inner surface of the hermetic metal package with a conductive adhesive. This may create an electrical connection a cathode surface of the one or more capacitor elements to an outer surface of the hermetic metal package and negative terminal positioned there. In order to provide very stable capacitance and ESR under high temperature load-life conditions, the capacitor assembly is preferably dried out prior to final sealing of the package in order to evacuate moisture from inner capacitor elements.

Referring now to FIG. 1, an exploded diagram illustrating components of an embodiment hermetically sealed polymer capacitor 100 is shown. The hermetically sealed polymer capacitor 100 preferably includes a case 102. The case 102 is preferably made of a metal, such as nickel, nickel based alloys, copper, copper based alloys, steel, titanium, and tantalum. The case 102 is preferably electrically conductive.

As shown in the orientations depicted in FIGS. 1-4G, the case 102 preferably includes an open anode end 150, an opposite cathode end 152, a lower side 154, an upper side 158, a first lateral side 156, and a second lateral side 160. The upper side 158 and lower side 154 are top and bottom walls that are opposite each other, and the first lateral side 156 and second lateral side 160 are side walls that are opposite each other. The open anode end 150, the cathode end 152, the lower side 154, the upper side 158, the first lateral side 156, and the second lateral side 160 may form an interior area 103 of the case 102.

The case 102 preferably contains in the interior area 103 a conductive paste 108, a first capacitor element 110 and a first positive lead 116 connected to and extending from the first capacitor element 110, a second capacitor element 112 and a second positive lead 118 connected to and extending from the second capacitor element 112. Optionally, a bushing 114 may be positioned toward the anode end 150 of the case 102.

The first capacitor element 110 and the second capacitor element 112 each preferably has an anode side 180 corresponding to the anode end 150 of the case, a base side 182 corresponding to the cathode end 152 of the case 102, a lower side 184 corresponding to the lower side 154 of the case 102, an upper side 188 corresponding to the upper side 158 of the case, a first lateral side 186 corresponding to the first lateral side 156 of the case 102, and a second lateral side 190 corresponding to the second lateral side 160 of the case 102. It is noted that the sides can be considered faces or surfaces of the capacitor elements.

A quantity of the conductive paste 108 is preferably applied to or supplied within the interior area 103 of the case 102 and may contact at least a portion of an inner surface of the cathode end 152, an inner surface of the lower side 154, an inner surface of the upper side 158, an inner surface of the first lateral side 156, and an inner surface of the second lateral side 160. The conductive paste 108 is initially preferably in an uncured and/or viscous and/or paste-like state. The conductive paste 108 preferably comprises a conductive metal, such as silver (Ag). In an example, the conductive paste 108 preferably comprises Ag flakes in an inorganic silicate aqueous composition. In another example, the conductive paste 108 preferably comprises an Ag epoxy. A quantity or measured amount of the conductive paste 108 is preferably dispensed in the interior area of the case 102. The first capacitor element 110 and the second capacitor element 112 are preferably inserted into the case 102 and pressed down into or otherwise disposed in contact with the conductive paste 108. The conductive paste 108 may thereby distribute itself, filling an available volume between any gaps provided between the first capacitor element 110 and the second capacitor element 112 and inner surface of the case 102. The conductive paste 108 is configured to be cured and hardened, as discussed further herein.

The quantity of the conductive paste 108 should be sufficient to cover at least portions of surfaces of the first capacitor element 110 and the second capacitor element 112. The conductive paste 108 preferably covers the base side 182 of the first capacitor element 110 and the second capacitor element 112 and all or some of, such as, by way of illustration, approximately 5% to approximately 99% of the lower side 184, the first lateral side 186, the upper side 188, and the second lateral side 190 of each capacitor element. The conductive paste 108 preferably does not extend to or otherwise cover the anode side 180, as contact with the anode wire could result in a short. The surfaces covered by the conductive paste 108 may be referred to as silvered anode surfaces.

The first capacitor element 110 is preferably separated from the second capacitor element 112 by a portion of the conductive paste 108 filling any gaps between the first capacitor element 110 and the second capacitor element 112. The first capacitor element 110 is preferably electrically connected to the second capacitor element 112 in parallel through facing silvered anode portions 120. The conductive paste 108 is preferably cured in order to provide reliable mechanical and electrical connection between outer surface of the first capacitor element 110 and the second capacitor element 112 and the case 102. In an illustrative example, the conductive paste 108 may be cured at approximately 80° C. to approximately 200° C. for approximately 0.25 hours to approximately 3 hours. After curing, the conductive paste 108 is preferably substantially hardened or substantially solid.

The first capacitor element 110 and the second capacitor element 112 preferably comprise sintered tantalum slugs. Each sintered tantalum slug is preferably electrochemically oxidized to create a tantalum pentoxide dielectric layer on an outer surface of each tantalum slug layer and then is preferably covered with one or more electrically conductive polymer layers to form the capacitor elements. Such polymer layers may comprise, but are not limited to, polypyrrole, polyaniline, Poly(3,4-ethylenedioxythiophene) (PEDOT), and other similar materials as are known to those in the relevant art.

The first positive lead 116 preferably extends from the anode side 180 of first capacitor element 110 and preferably extends towards the anode end 150 of the case 102. The anode end 150 of the case 102 is preferably opposite the cathode end 152 of the case 102. The first positive lead 116 preferably comprises a wire protruding from the sintered tantalum slug. The first positive lead 116 preferably comprises tantalum. The first positive lead 116 is preferably pressed into the tantalum slug during sintering or welded to the tantalum slug after sintering.

The second positive lead 118 preferably extends from the anode side 180 of the second capacitor element 112 and preferably extends towards the anode end 150 of the case 102. The second positive lead 118 preferably comprises a wire protruding from the sintered tantalum slug. The second positive lead 118 preferably comprises tantalum. The second positive lead 118 is preferably pressed into the tantalum slug during sintering or welded to the tantalum slug after sintering. The first positive lead 116 and the second positive lead 118 may be substantially cylindrical in cross-section and may have a substantially straight length.

If a bushing 114 is included in the case 102, it is preferably positioned between the first capacitor element 110 and the second capacitor element 112 and a cover 122. The bushing 114 is preferably positioned toward the anode end 150 of the case 102. The bushing 114 may comprise an insulating material such as rubber or plastic. The bushing 114 may comprise one or more of polytetrafluoroethylene (PTFE), Kapton®, polyethylene (PE), and poly(p-phenylene) (PPP). The bushing 114 is preferably shaped in such a manner that allows the first positive lead 116 and the second positive lead 118 to pass through one or more openings in the bushing 114. It is noted that in certain variations, a bushing may not be used.

The cover 122 preferably closes off the open anode end 150 of the case 102, and preferably comprises a metal, such as steel, nickel, copper, steel, titanium, tantalum, and/or alloys thereof. The cover 122 may is preferably a generally flat panel or wall shaped to fit in and cover the open anode end 150 of the case 102. The cover 122 preferably has a first hole corresponding to a location and dimension of the first positive lead 116 and a second hole corresponding to a location and dimension of the second positive lead 118. The combination of the case 102 and the cover 122 may be referred to as the capacitor body or device body.

The cover 122 preferably includes one or more glass to metal seals (designated either individually or collectively as GTMS) 124. The one or more GTMS 124 preferably include a first glass insulator 126 and a first metal tube 128, and a second glass insulator 134 and a second metal tube 136. The first glass insulator 126 is preferably positioned in the first hole of the cover 122 and the second glass insulator 134 is preferably positioned in the second hole of the cover 122. The first positive lead 116 may extend through the first glass insulator 126, which insulates it from the cover 122. The second positive lead 118 may extend through the second first glass insulator 134, which insulates it from the cover 122. The first metal tube 128 and the second metal tube 136 may comprise one or more of nickel, copper, steel, titanium, tantalum, and/or alloys thereof. The first positive lead 116 may extend through the first metal tube 128 and is preferably clipped to the same length. The second positive lead 118 may extend through the second metal tube 136 and is preferably clipped to the same length. The cover 122 is preferably seam welded to the case 102.

Prior to the sealing of the one or more GTMS 124 by welding the metal tubes to the leads, the capacitor body is preferably dried out in order to evacuate moisture from the interior area 103, the first capacitor element 110, the second capacitor element 112, and the conductive paste 108. The capacitor body may be dried at approximately 120° C. to approximately 180° C. for approximately 2 hours to 8 hours in order to evacuate moisture from the capacitor body.

Figure 2:
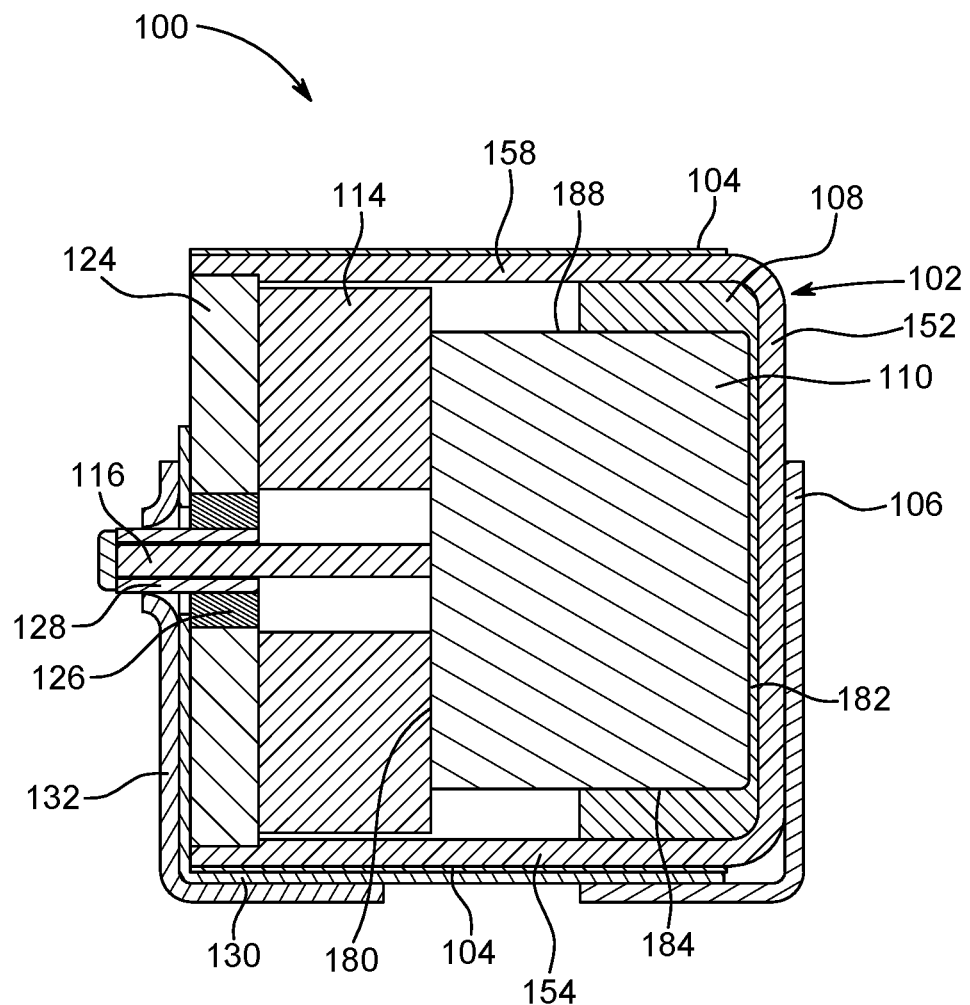
FIG. 2 is a cross section view of the hermitically sealed polymer capacitor taken along line A-A in FIG. 4A.
Figure 3:
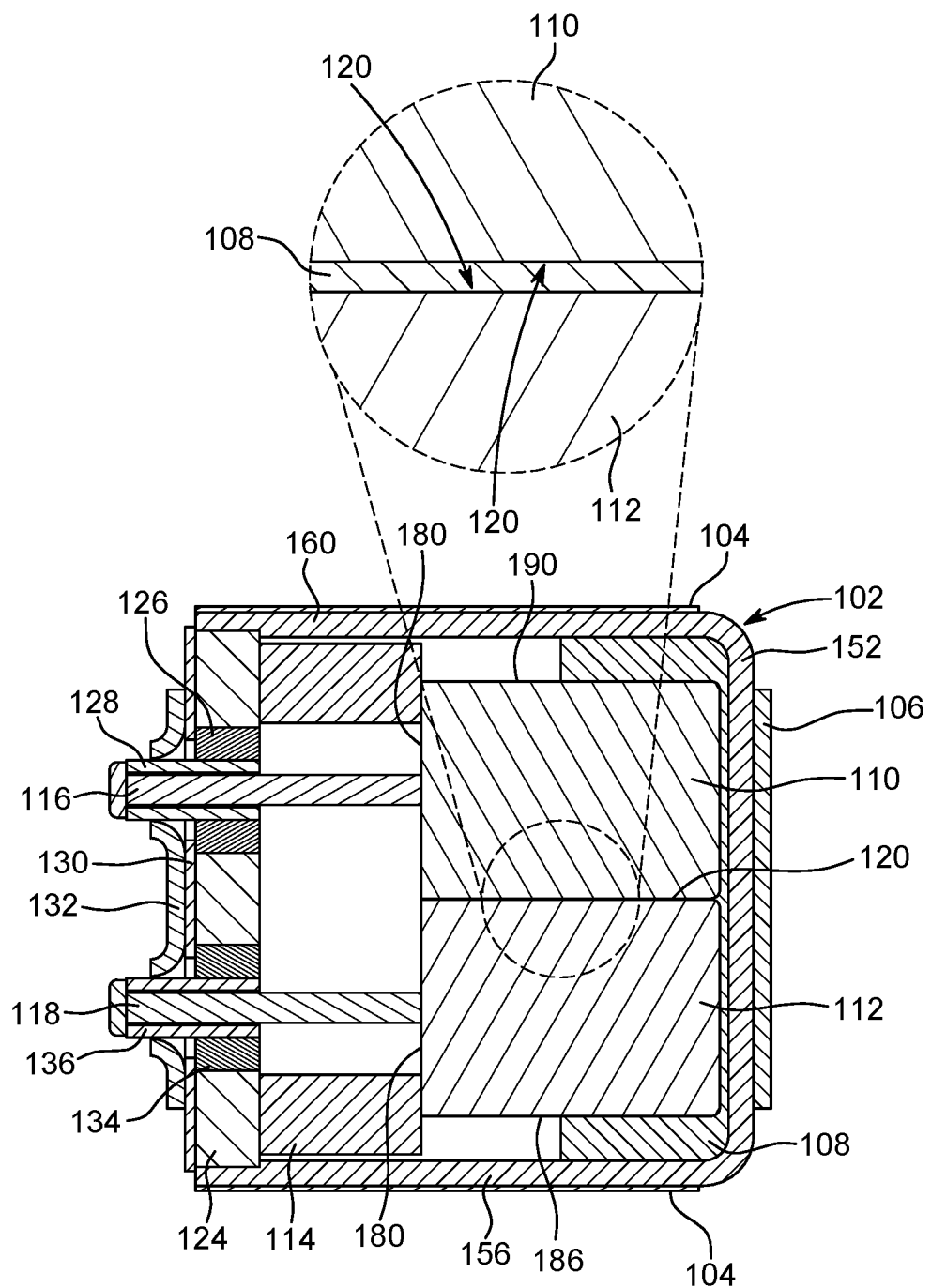
FIG. 3 is a cross section view of the hermitically sealed polymer capacitor taken along line B-B in FIG. 4C.

After the drying process, the device is preferably sealed by welding the cover 122 over the open anode end 150 of the case 102, and welding the first metal tube 128 to the first positive lead 116 and welding the second metal tube 136 to the second positive lead 118 to form a package. The package is preferably hermetically sealed. The final moisture content within the package is preferably approximately less than 25% relative humidity at 20° C. to 30° C. As shown in FIGS. 1-3, the first positive lead 116 and the second positive lead 118 extend all the way from the sintered tantalum slugs through the one or more GTMS 124 as single pieces, to an exterior of the case 102.

The case 102 is preferably sheathed in an insulator 104, which may be an insulative sleeve. The insulator 104 may surround the lower side 154, the first lateral side 156, the upper side 158, and the second lateral side 160 of the case 102, leaving the cathode end 152 of the case 102 and the cover 122 exposed. The insulator 104 preferably comprises a polyimide film, PTFE, fluorinated ethylene propylene (FEP), VITON™, polyvinyl chloride (PVC), polyurethane, and others.

An anode insulator 130 is preferably positioned on the cover 122 and may be formed as an insulative shim. The anode insulator 130 is preferably generally L-shaped, with an upstanding first portion 131 on the cover 122 and a generally horizontal lower portion 133 extending along the lower side 154 of the case 102 over the insulator 104, although other shapes may be employed. The upstanding first portion 131 extends upwards along the cover 122 above the part of the cover 122 including the GTMS 124. The generally horizontal lower portion 133 of the anode insulator 130 preferably extends along at least a portion of the lower side 154 of the case 102.

The anode insulator 130 preferably has a first hole 135 corresponding to the location and dimension of the first positive lead 116 and a second hole 137 corresponding to the location and dimension of the second positive lead 118. The first hole 135 and the second hole 137 preferably allow the first positive lead 116 and the first metal tube 128 as well as the second positive lead 118 and the second metal tube 136 to pass through, and may also assist in aligning the first positive lead 116 and the first metal tube 128 as well as the second positive lead 118 and the second metal tube 136. The anode insulator 130 may comprise an insulating material such as a rubber, plastic, or Teflon. The anode insulator 130 may comprise one or more of PTFE, Polyimide, PE, and PPP.

An anode terminal 132 is preferably placed over the anode insulator 130 and is in electrical communication with the first positive lead 116 and the second positive lead 118 via the metal tubes of the GTMS 124. The anode terminal 132 is preferably generally L-shaped, with an upstanding first portion 139 on the anode insulator 130 and a generally horizontal lower portion 141 extending along the lower side 154 of the case 102 over the anode insulator 130, although other shapes may be employed. The upstanding first portion 139 of the anode terminal 132 preferably has a smaller dimension that the first portion 131 of the anode insulator 130, such that the first portion 139 of the anode terminal 132 is completely insulated from the cover 122 by the first portion 131 of the anode insulator 130. The generally horizontal lower portion 141 of the anode terminal 132 preferably extends along at least a portion of the horizontal lower portion 133 of the anode insulator 130 and preferably extends towards the cathode end 152 of the case 102. The anode terminal 132 preferably comprises a metal, such as nickel, nickel based alloys, copper, and copper based alloys. The anode terminal 132 may be soldered/plated with tin, lead, palladium, gold, and/or alloys thereof. The anode terminal 132 forms a surface mount terminal for the hermetically sealed capacitor 100.

The anode terminal 132 preferably has a first hole 143 corresponding to the location and dimension of the first positive lead 116 and a second hole 145 corresponding to the location and dimension of the second positive lead 118. The first hole 143 and the second hole 145 preferably allow the first positive lead 116 and the first metal tube 128 as well as the second positive lead 118 and the second metal tube 136 to pass through, and may assist in aligning the first metal tube 128 as well as the second positive lead 118 and the second metal tube 136. The edges of the first hole 143 are preferably welded to the first metal tube 128 to form an electrical connection. The edges of the second hole 145 are preferably welded to the second metal tube 136 to form an electrical connection.

A cathode terminal 106 is preferably welded to the cathode end of the case 102 to form an electrical connection. The cathode terminal 106 is preferably generally L-shaped, with an upstanding first portion 147 on the cathode end of the case 102 and a generally horizontal lower portion 149 extending along the lower side 154 of the case 102 over the anode insulator 130, although other shapes may be employed. The upstanding first portion 147 of the cathode terminal 106 extends along at least a portion of the cathode end 152 of the case 102. The generally horizontal lower portion 149 of the cathode terminal 106 preferably extends along at least a portion of the horizontal lower portion 133 of the anode insulator 130, and is separated from the anode terminal 132 by a gap. The cathode terminal 106 preferably comprises a metal, such as nickel, nickel based alloys, copper, and copper based alloys. The cathode terminal 106 may be soldered/plated with tin, lead, palladium, gold, and/or alloys thereof. The cathode terminal 106 forms a surface mount terminal for the hermetically sealed capacitor 100.

Figure 4A:
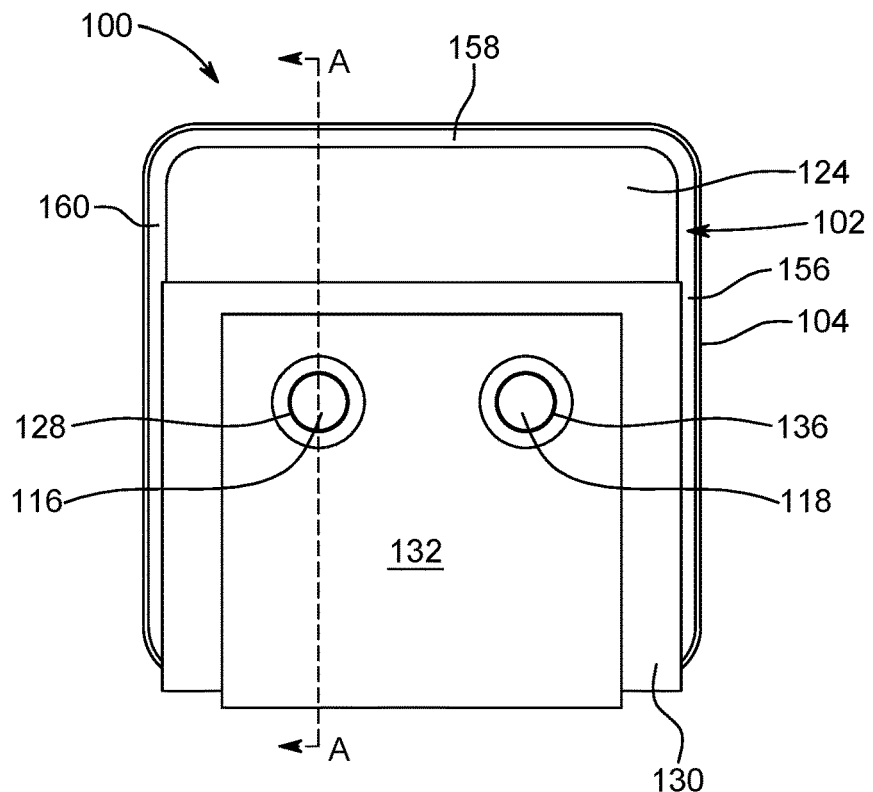
FIGS. 4A-4G are various views of the hermitically sealed polymer capacitor.

Referring now to FIG. 2, a vertical cross section view of the hermetically sealed polymer capacitor 100 is shown. The vertical cross section view is along line A-A as shown in FIG. 4A. FIG. 2 shows additional internal detail of the hermetically sealed capacitor 100. FIG. 2 shows the conductive paste 108 is preferably in contact with the inner surface of the lower side 154 of the case 102, the inner surface of the cathode end 152 of the case 102, the inner surface of the upper side 158 of the case, the base side 182 of the first capacitor element 110, the upper side 188 of the first capacitor element 110, and the lower side 184 of the first capacitor element 110. The conductive paste 108 preferably does not extend to the anode end 180 of the first capacitor element 110.

The first positive lead 116 preferably extends out from the anode end 180 of the first capacitor element 110. The first positive lead 116 preferably extends through the optional bushing 114. The first positive lead 116 preferably extends through the first metal tube 128, to which it is welded. The first metal tube 128 is preferably located within the first glass insulator 126 of the GTMS 124. The cover 122 is preferably welded to the case 102.

The upstanding first portion 131 of the anode insulator is preferably located on the cover 122 and the generally horizontal lower portion 133 preferably extends along the lower side 154 of the case 102 over the insulator 104. The upstanding first portion 131 preferably extends upwards along the cover 122 above the part of the cover 122 including the GTMS 124. The generally horizontal lower portion 133 of the anode insulator 130 preferably extends along at least a portion of the lower side 154 of the case 102.

The anode terminal 132 is preferably located on the anode insulator 130 and is preferably in electrical communication with the first positive lead 116 via the first metal tube 128. The upstanding first portion 139 of the anode terminal 132 is preferably located on the anode insulator 130 and the generally horizontal lower portion 141 preferably extends along the lower side 154 of the case 102 over the anode insulator 130. The upstanding first portion 139 of the anode terminal 132 preferably has a smaller dimension that the first portion 131 of the anode insulator 130, such that the first portion 139 of the anode terminal 132 is completely insulated from the cover 122 by the first portion 131 of the anode insulator 130. The generally horizontal lower portion 141 of the anode terminal 132 preferably extends along at least a portion of the horizontal lower portion 133 of the anode insulator 130 and preferably extends towards the cathode end 152 of the case 102.

The cathode terminal 106 is preferably welded to the cathode end of the case 102 to form an electrical connection. The upstanding first portion 147 of the cathode terminal 106 is preferably located on the cathode end 152 of the case 102 and the generally horizontal lower portion 149 preferably extends along the lower side 154 of the case 102 over the anode insulator 130. The upstanding first portion 147 of the cathode terminal 106 preferably extends along at least a portion of the cathode end 152 of the case 102. The generally horizontal lower portion 149 of the cathode terminal 106 preferably extends along at least a portion of the horizontal lower portion 133 of the anode insulator 130, and is separated from the anode terminal 132 by a gap.

Referring now to FIG. 3, a horizontal cross section view of the hermetically sealed polymer capacitor 100 is shown. The horizontal cross section view is taken along line B-B as shown in FIG. 4C. FIG. 3 shows additional internal detail of the hermetically sealed capacitor 100. FIG. 3 shows the conductive paste 108 is preferably in contact with the inner surface of the first lateral side 156 of the case 102, the inner surface of the cathode end 152 of the case 102, the inner surface of the second lateral side 160 of the case, the base side 182 of the first capacitor element 110 and the second capacitor element 112, first lateral side 186 of the second capacitor element 112, and the second lateral side 190 of the first capacitor element 110. The conductive paste 108 preferably does not extend to the anode end 180 of the first capacitor element 110 and the second capacitor element 112.

The first positive lead 116 and the second positive lead 118 preferably extend out from the anode end 180 of the first capacitor element 110 and the second capacitor element 112. The first positive lead 116 and the second positive lead 118 preferably extend through the optional bushing 114. The first positive lead 116 and the second positive lead 118 preferably extend through the first metal tube 128 and the second metal tube 136, to which they are welded. The first metal tube 128 and the second metal tube 136 are preferably located within the first glass insulator 126 and the second glass insulator 134 of the GTMS 124. The cover 122 is preferably welded to the case 102.

The upstanding first portion 131 of the anode insulator is preferably located on the cover 122. The upstanding first portion 131 preferably extends upwards along the cover 122 above the part of the cover 122 including the GTMS 124.

The anode terminal 132 is preferably located on the anode insulator 130 and is preferably in electrical communication with the first positive lead 116 and the second positive lead 118 via the first metal tube 128 and the second metal tube 136. The upstanding first portion 139 of the anode terminal 132 is preferably located on the anode insulator 130 and preferably has a smaller dimension that the first portion 131 of the anode insulator 130, such that the first portion 139 of the anode terminal 132 is completely insulated from the cover 122 by the first portion 131 of the anode insulator 130.

The cathode terminal 106 is preferably welded to the cathode end of the case 102 to form an electrical connection. The upstanding first portion 147 of the cathode terminal 106 is preferably located on the cathode end 152 of the case 102. The upstanding first portion 147 of the cathode terminal 106 preferably extends along at least a portion of the cathode end 152 of the case 102. The insulator 104 is preferably located on the first lateral side 156 of the case 102 and the second lateral side 160 of the case 102.

The inset of FIG. 3 shows the gap between the first capacitor element 110 and the second capacitor element 112, which is preferably filled with the conductive paste 108. The inset shows the facing silvered anode portions 120 of the first capacitor element 110 and the second capacitor element 112.

Figure 4B:
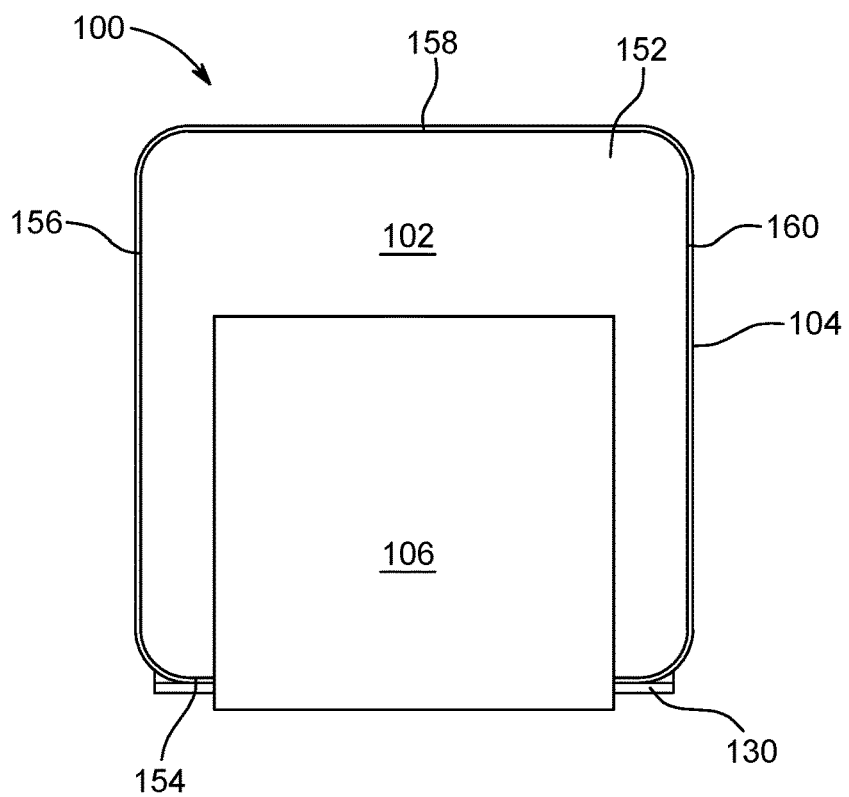
Figure 4C:
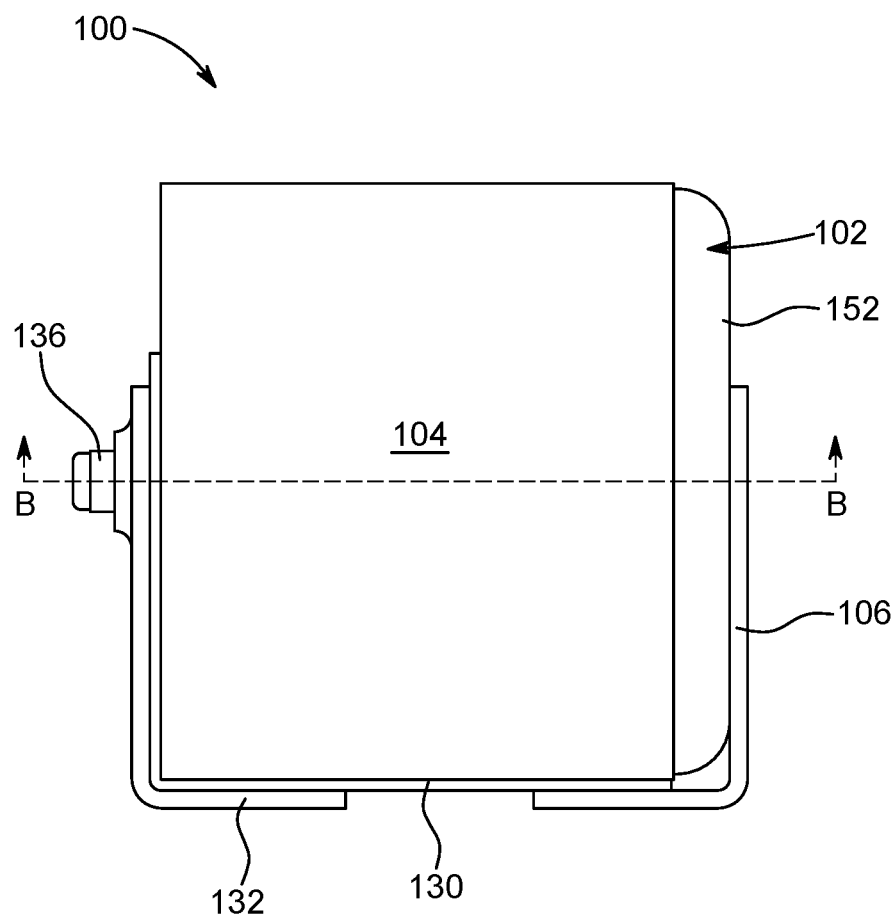
Figure 4D:
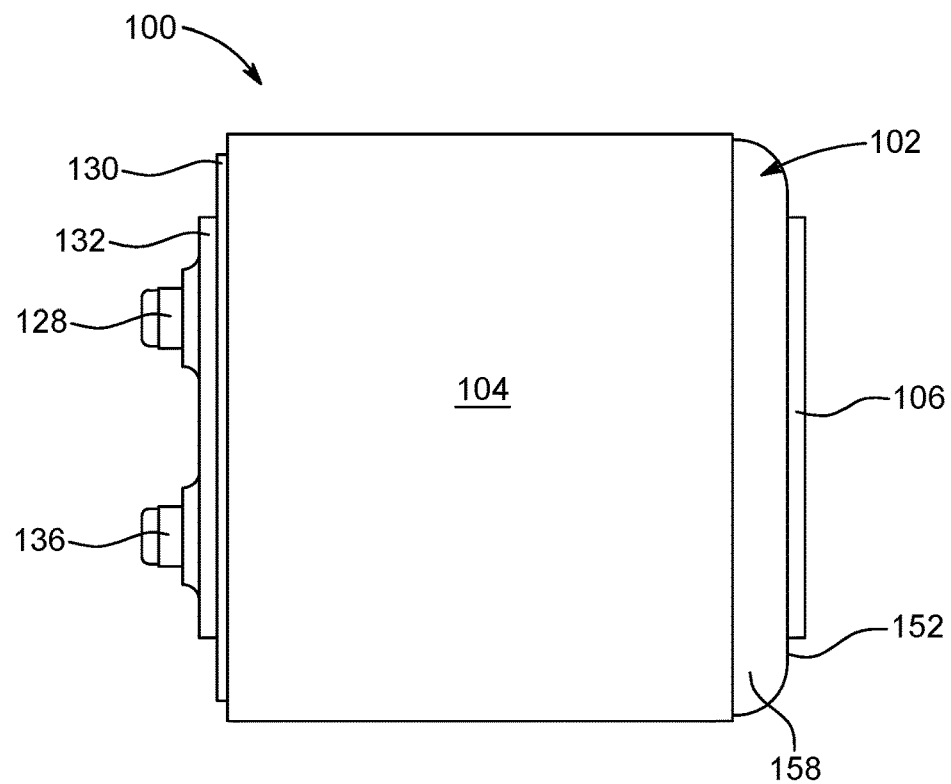
Figure 4E:
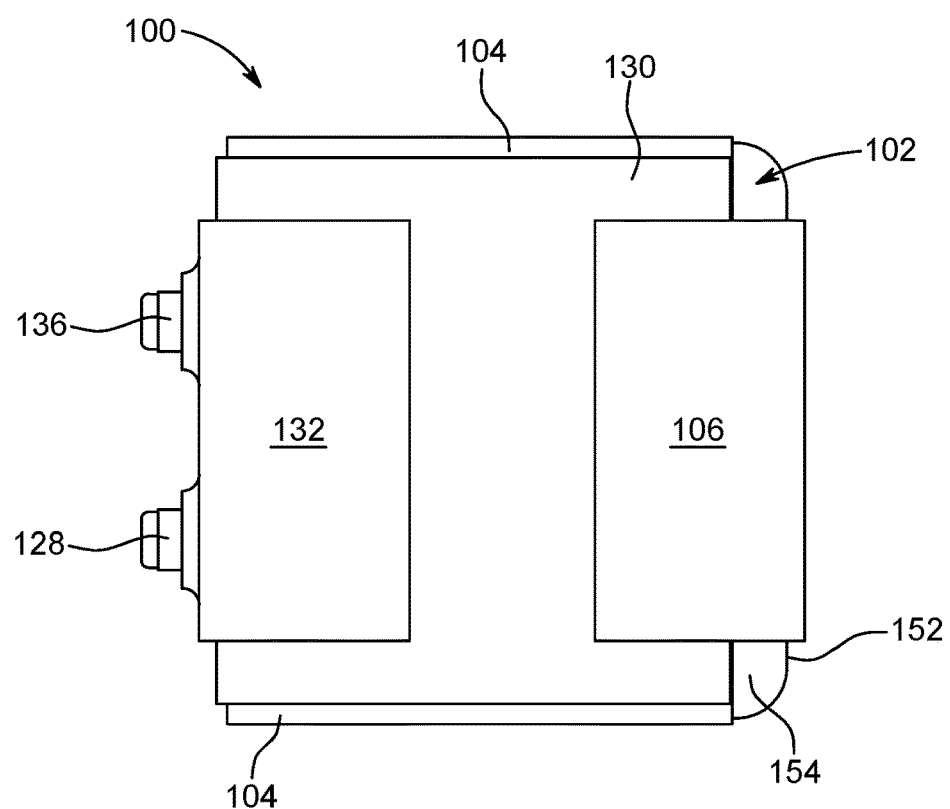
Figure 4F:
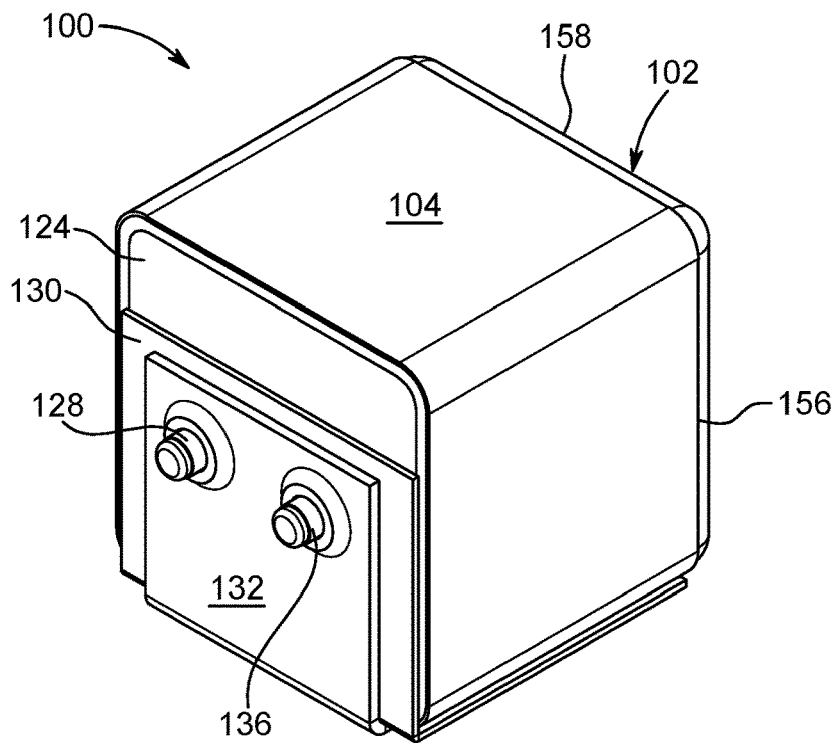
Figure 4G:
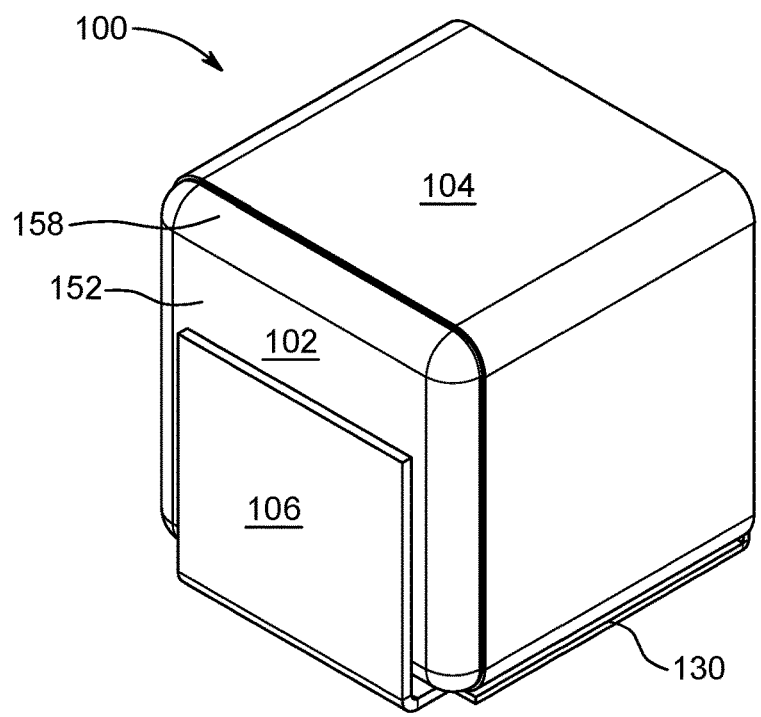

Referring now to FIGS. 4A-4G, different perspective and plan views of the hermetically sealed polymer capacitor 100 are shown. FIG. 4A is a front view of the hermetically sealed polymer capacitor 100 showing the anode end. FIG. 4B is a rear view of the hermetically sealed polymer capacitor 100 showing the cathode end. FIG. 4C is a side view of the hermetically sealed polymer capacitor 100. FIG. 4D is a top view of the hermetically sealed polymer capacitor 100 showing the upper side 158 of the case 102. FIG. 4E is a bottom view of the hermetically sealed polymer capacitor 100 showing the lower side 154 of the case 102 as described above. FIG. 4F is a perspective view of the front of the hermetically sealed polymer capacitor 100 showing the anode end. FIG. 4G is a perspective view of the rear of the hermetically sealed polymer capacitor 100 showing the cathode end.

Figure 5:
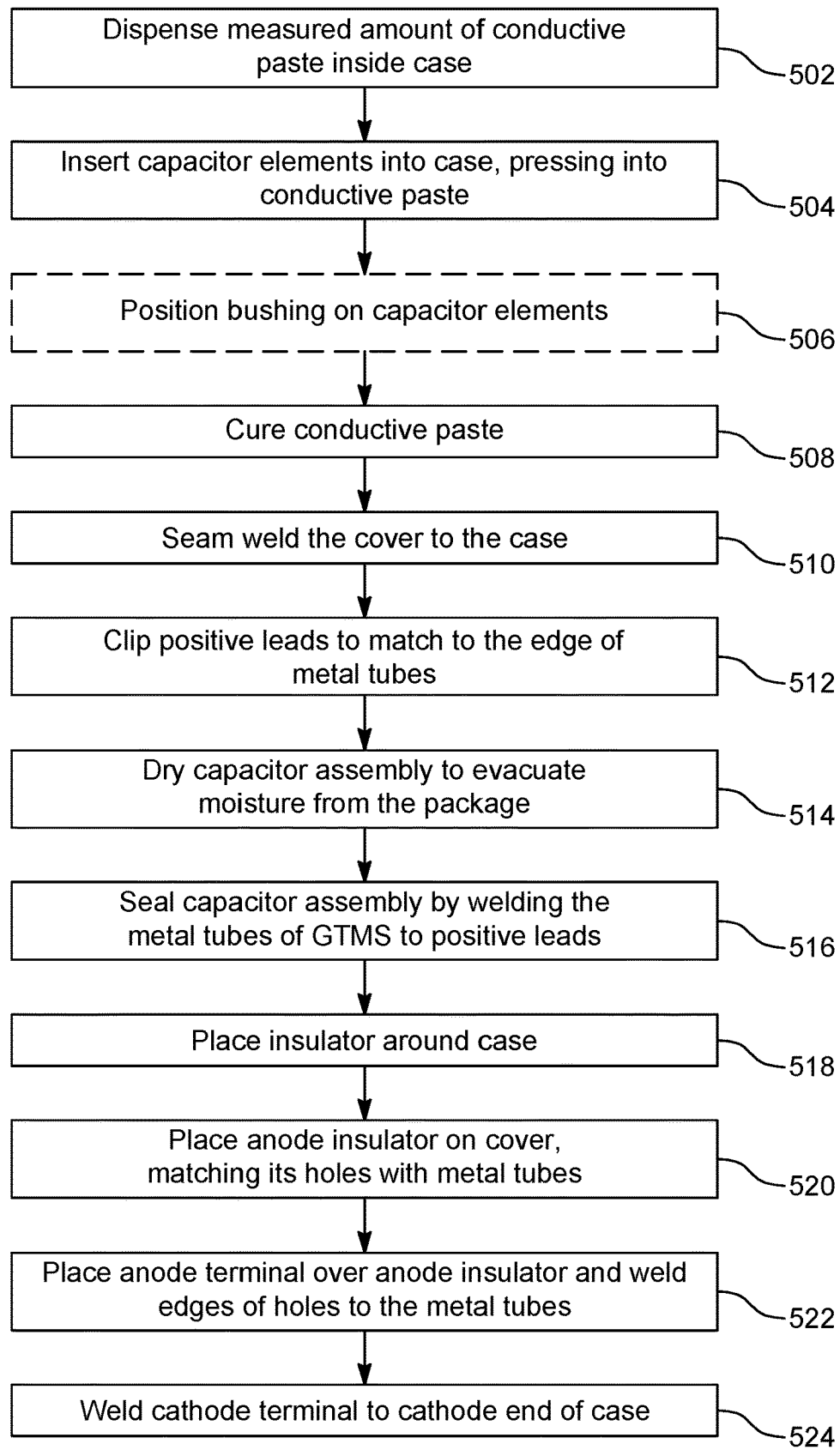
FIG. 5 is a flowchart illustrating a method of forming the hermitically sealed polymer capacitor.

Referring now to FIG. 5, a flow chart illustrating a method of assembling the hermetically sealed polymer capacitor 100 is shown. In step 502, a measured amount of the conductive paste 108 is preferably dispensed inside the case 102.

In step 504, the first capacitor element 110 and the second capacitor element 112 are inserted into the case 102 and pressed into the conductive paste 108. The first positive lead 116 and the second positive lead 118 extend towards the anode end 150 of the case 102.

In optional step 506, the bushing 114 is preferably placed on the first capacitor element 110 and the second capacitor element 112. The first positive lead 116 and the second positive lead 118 are preferably threaded through holes in the bushing 114.

The cover 122 is preferably placed on the anode end 150 of the case 102. The first positive lead 116 and the second positive lead 118 are threaded through the first metal tube 128 and the second metal tube 136 of the one or more GTMS 124. In step 508, the conductive paste 108 is preferably cured. In step 510, the cover 122 is preferably seam welded to the case 102.

In step 512, the first positive lead 116 and the second positive lead 118 are clipped to the same length as the first metal tube 128 and the second metal tube 136.

In step 514, the capacitor assembly is preferably dried to evacuate moisture from the package. In step 516, after drying, the capacitor assembly is preferably sealed by welding the first positive lead 116 to the first metal tube 128 of the one or more GTMS 124 and welding the second positive lead 118 to the second metal tube 136 of the one or more GTMS 124.

In step 518, the insulator 104 is preferably placed around the sides of the case 102. In step 520, the anode insulator 130 is preferably placed on the cover 122, aligning its holes with the first metal tube 128 and the second metal tube 136. In step 522, the anode terminal 132 is preferably placed on the anode insulator 130 and edges of its openings are preferably welded to the first metal tube 128 and the second metal tube 136. In step 524, the cathode terminal 106 is preferably welded to the cathode end of the case 102.

Figure 6:
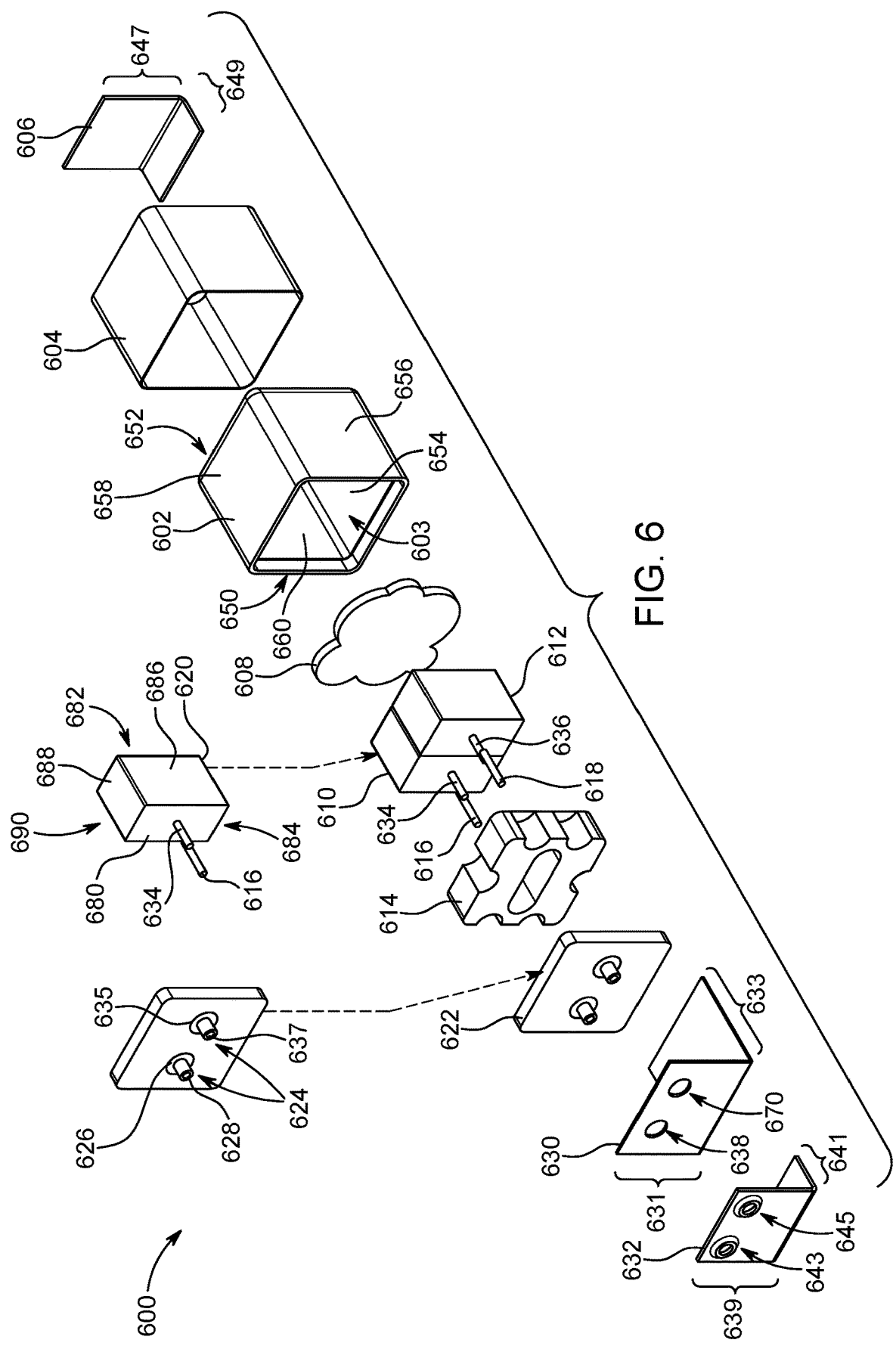
FIG. 6 is an exploded diagram illustrating components of an embodiment of a hermetically sealed polymer capacitor.

Referring now to FIG. 6, an exploded diagram illustrating components of another embodiment of a surface mount hermetically sealed polymer capacitor 600 is shown. The hermetically sealed polymer capacitor 600 preferably includes a case 602, similar in design as previously described case 102. The case 602 is preferably made of a metal, such as nickel, nickel based alloys, copper, copper based alloys, steel, titanium, and tantalum. The case 602 is preferably electrically conductive.

As shown in the orientations depicted in FIGS. 6-9G, the case 602 preferably includes an open anode end 650, an opposite cathode end 652, a lower side 654, a first lateral side 656, an upper side 658, and a second lateral side 660. The upper side 658 and lower side 654 are top and bottom walls that are opposite each other, and the first lateral side 656 and second lateral side 660 are side walls that are opposite each other. The open anode end 650, the cathode end 652, the lower side 654, the upper side 658, the first lateral side 656, and the second lateral side 660 may form an interior area 603 of the case 602.

The case 602 preferably contains in the interior area 603 a conductive paste 608, a first capacitor element 610 with a first anode wire 634 and a first positive lead 616 and a second capacitor element 612 with a second anode wire 636 and a second positive lead 618. Optionally, a bushing 114 may be positioned toward the anode end 650 of the case 602.

The first capacitor element 610 and the second capacitor element 612 each preferably has an anode side 680 corresponding to the anode end 650 of the case, a base side 682 corresponding to the cathode end 620 of the case 602, a lower side 684 corresponding to the lower side 654 of the case 602, a first lateral side 686 corresponding to the first lateral side 656 of the case 602, an upper side 658 corresponding to the upper side 658 of the case, and a second lateral side 690 corresponding to the second lateral side 660 of the case 602.

A quantity of the conductive paste 608 is preferably applied to the interior area 603 of the case 602 and may contact at least a portion of an inner surface of the cathode end 652, an inner surface of the lower side 654, an inner surface of the upper side 658, an inner surface of the first lateral side 656, and an inner surface of the second lateral side 660. The conductive paste 608 is initially preferably in an uncured and/or viscous and/or paste-like state. The conductive paste 608 preferably comprises a conductive metal, such as silver (Ag). In an example, the conductive paste 608 preferably comprises Ag flakes in an inorganic silicate aqueous. In another example, the conductive paste 608 preferably comprises Ag epoxy. A quantity or measured amount of the conductive paste 608 is preferably dispensed in the case 602. The first capacitor element 610 and the second capacitor element 612 are preferably inserted into the case 602 and pressed down into or otherwise disposed in contact with the conductive paste 608. The conductive paste 608 may distribute itself, filling an available volume such as filling gaps provided between the first capacitor element 610 and the second capacitor element 612 and inner surface of the case 602. The conductive paste 608 is configured to be cured and hardened, as discussed further herein.

The quantity of the conductive paste 608 should be sufficient to cover at least portions of surfaces of the first capacitor element and the second capacitor element 112. The conductive paste 608 preferably covers the base side 682 of the first capacitor element 610 and the second capacitor element 612 and approximately 5% to approximately 99% of the lower side 684, the first lateral side 686, the upper side 688, and the second lateral side 690. The conductive paste 608 preferably does not extend to the anode side 680 as contact with the anode wire could result in a short. The covered surfaces may be referred to as silvered anode surfaces.

The first capacitor element 610 and the second capacitor element 612 are preferably surrounded by the conductive paste 608. The first capacitor element 610 is preferably separated from the second capacitor element 612 by a portion of the conductive paste 608. The first capacitor element 610 is preferably electrically connected to the second capacitor element 612 in parallel through facing silvered anode portions 620. The conductive paste 608 is preferably cured in order to provide reliable mechanical and electrical connection between outer surface of the first capacitor element 610 and the second capacitor element 612 and the case 602. In an illustrative example, the conductive paste 608 is preferably cured at approximately 80° C. to approximately 200° C. for approximately 0.25 hours to approximately 3 hours. After curing, the conductive paste 608 is preferably substantially solid.

The first capacitor element 610 and the second capacitor element 612 are preferably composed of a sintered tantalum slug. The sintered tantalum slug is preferably electrochemically oxidized to create a tantalum pentoxide dielectric layer on an outer surface of the tantalum slug layer and then is preferably covered with one or more electrically conductive polymer layers to form the capacitor elements. Such polymer layers may comprise, but are not limited to, polypyrrole, polyaniline, PEDOT, and other similar materials as are known to those in the relevant art.

The first anode wire 634 preferably extends from the anode side 680 of the first capacitor element 610 and preferably extends towards the anode end 650 of the case 602. The anode end 150 of the case 602 is preferably opposite the cathode end of the case 602. The first anode wire 634 preferably comprises a wire protruding from the sintered tantalum slug. The first anode wire 634 preferably comprises tantalum. The first anode wire 634 is preferably pressed into the tantalum slug during sintering or welded to the tantalum slug after sintering.

The second anode wire 636 preferably extends from the anode side 680 of the second capacitor element 612 and preferably extends towards the anode end 650 of the case 602. The second anode wire 636 preferably comprises a wire protruding from the sintered tantalum slug. The second anode wire 636 preferably comprises tantalum. The second anode wire 636 is preferably pressed into the tantalum slug during sintering or welded to the tantalum slug after sintering. The first anode wire 634 and the second anode wire 636 are preferably substantially cylindrical in cross-section and may have a substantially straight length.

A first positive lead 616 is preferably welded to the first anode wire 634. The first positive lead 616 preferably comprises one or more of nickel, copper, steel, titanium, tantalum, and/or alloys thereof. A second positive lead 618 is preferably welded to the second anode wire 636. The second positive lead 618 preferably comprises one or more of nickel, copper, steel, titanium, tantalum, and/or alloys thereof. The first positive lead 116 and the second positive lead 118 is preferably substantially cylindrical in cross-section and may have a substantially straight length.

If a bushing 614 is included in the case 602, it is preferably positioned between the first capacitor element 610 and the second capacitor element 612 and a cover 622. The bushing 614 is preferably positioned toward the anode end 650 of the case 602. The bushing 614 may comprise an insulating material such as rubber or plastic. The bushing 614 preferably comprises one or more of PTFE, Kapton®, PE, and PPP. The bushing 614 is preferably shaped in a manner that allows the first positive lead 616 and the second positive lead 618 to pass through one or more openings in the bushing 614. It is noted that in certain variations, a bushing 614 may not be used.

The cover 622 preferably closes off the open anode end 650 of the case 602, and preferably comprises a metal, such as steel, nickel, copper, steel, titanium, tantalum, and/or alloys thereof. The cover 622 is preferably a generally flat panel or wall shaped to fit in and cover the open anode end 650 of the case 602. The cover 622 preferably has a first hole corresponding to the location and dimension of the first positive lead 616 and a second hole corresponding to the location and dimension of the second positive lead 618. The combination of the case 602 and the cover 622 may be referred to as the capacitor body or device body.

The cover 622 preferably includes one or more seals providing insulation from the cover 622, namely, one or more GTMS 624. The one or more GTMS 624 preferably include a first glass insulator 626 and a first metal tube 628, and a second glass insulator 635 and a second metal tube 637. The first glass insulator 626 is preferably positioned in the first hole of the cover 622 and the second glass insulator 635 is preferably positioned in the second hole of the cover 622. The first positive lead 616 may extend through the first glass insulator 626, which insulates it from the cover 622. The second positive lead 618 may extend through the second glass insulator 635, which insulates it from the cover 622. The first metal tube 628 and the second metal tube 637 are preferably composed of one or more of nickel, copper, steel, titanium, tantalum, and/or alloys thereof. The first positive lead 616 may extend through the first metal tube 628 and is preferably clipped to the same length. The second positive lead 618 may extend through the second metal tube 637 and is preferably clipped to the same length. The cover 622 is preferably seam welded to the case 602 to close off the opening at the anode end 650 of the case 602.

Prior to the sealing of the one or more GTMS 624 by welding the metal tubes to the leads, the capacitor body is preferably dried out in order to evacuate moisture from the interior area 603, the first capacitor element 610, the second capacitor element 612, and the conductive paste 608. The unfinished package is preferably dried at approximately 120° C. to approximately 180° C. for approximately 2 hours to 8 hours in order to evacuate moisture from the capacitor body.

After the drying process, the device is preferably sealed by welding the cover 622 over the open anode end 650 of the case 602, and welding the first metal tube 628 to the first positive lead 616 and welding the second metal tube 637 to the second positive lead 618 to form a package. The package is preferably hermetically sealed. The final moisture content within the package is preferably approximately less than approximately 25% relative humidity at approximately 20° C. to 30° C.

The case 602 is preferably sheathed in an insulator 604, which may be an insulative sleeve. The insulator 604 may surround the lower side 654, the first lateral side 656, the upper side 658, and the second lateral side 660 of the case 602, leaving the cathode end 652 of the case 602 and the cover 622 exposed. The insulator 104 preferably comprises a polyimide film, PTFE, FEP, VITON™, (PVC, polyurethane, and others.

An anode insulator 630 is preferably positioned on the cover 622, and may be formed as an insulative shim. The anode insulator 630 is preferably generally L-shaped, with an upstanding first portion 631 extending along the cover 622 and a generally horizontal lower portion 633 extending along the lower side 654 of the case 602 over the insulator 604, although other shapes may be employed. The upstanding first portion 631 extends upwards along the cover 622 above the part of the cover 622 including the GTMS 124. The generally horizontal lower portion 633 of the anode insulator 630 preferably extends along at least a portion of the lower side 654 of the case 602.

The anode insulator 630 preferably has a first hole 638 corresponding to the location and dimension of the first positive lead 616 and a second hole 670 corresponding to the location and dimension of the second positive lead 618. The first hole 638 and the second hole 670 preferably allow the first positive lead 616 and the first metal tube 628 as well as the second positive lead 618 and the second metal tube 637 to pass through and may also assist in aligning the first positive lead 616 and the first metal tube 628 as well as the second positive lead 618 and the second metal tube 637. The anode insulator 630 may comprise an insulating material such as a rubber, plastic, or Teflon. The anode insulator 630 preferably comprises one or more of PTFE, Polyimide, PE, and PPP.

An anode terminal 632 is preferably placed over the anode insulator 630 and is in electrical communication with the first positive lead 616 and the second positive lead 618 via the metal tubes of the GTMS 624. The anode terminal 632 is preferably generally L-shaped, with an upstanding first portion 639 on the anode insulator 630 and a generally horizontal lower portion 641 extending along the lower side 654 of the case 602 over the anode insulator 630, although other shapes may be employed. The upstanding first portion 639 of the anode terminal 632 preferably has a smaller dimension that the first portion 631 of the anode insulator 630, such that the first portion 639 of the anode terminal 632 is completely insulated from the cover 622 by the first portion 631 of the anode insulator 630. The generally horizontal lower portion 641 of the anode terminal 132 preferably extends along at least a portion of the horizontal lower portion 133 of the anode insulator 630 preferably towards the cathode end 652 of the case 602. The anode terminal 632 preferably comprises a metal, such as nickel, nickel based alloys, copper, and copper based alloys. The anode terminal 632 may be soldered/plated with tin, lead, palladium, gold, and/or alloys thereof. The anode terminal 632 forms a surface mount terminal for the hermetically sealed capacitor 600.

The anode terminal 632 preferably has a first hole 643 corresponding to the location and dimension of the first positive lead 616 and a second hole 645 corresponding to the location and dimension of the second positive lead 618. The first hole 643 and the second hole 645 may allow the first positive lead 616 and the first metal tube 628 as well as the second positive lead 618 and the second metal tube 637 to pass through. The edges of the first hole 643 of the anode terminal 632 are preferably welded to the first metal tube 628 to form an electrical connection. The edges of the second hole 645 of the anode terminal 632 are preferably welded to the second metal tube 637 to form an electrical connection.

A cathode terminal 606 is preferably welded to the cathode end of the case 602 to form an electrical connection. The cathode terminal 606 is preferably generally L-shaped, although other shapes may be employed, with an upstanding first portion 647 extending along at least a portion of the cathode end 652 of the case 602 and a generally horizontal lower portion 649 extending along at least the lower side 654 of the case 602 and over the anode insulator 630. The generally horizontal lower portion 649 of the cathode terminal 606 preferably extends along at least a portion of the horizontal lower portion 649 of the anode insulator and is separated from the anode terminal 632 by a gap. The cathode terminal 606 preferably comprises a metal, such as nickel, nickel based alloys, copper, and copper based alloys. The cathode terminal 606 may be soldered/plated with tin, lead, palladium, gold, or alloys thereof. The cathode terminal 606 forms a surface mount terminal for the hermetically sealed capacitor 600.

Figure 7:
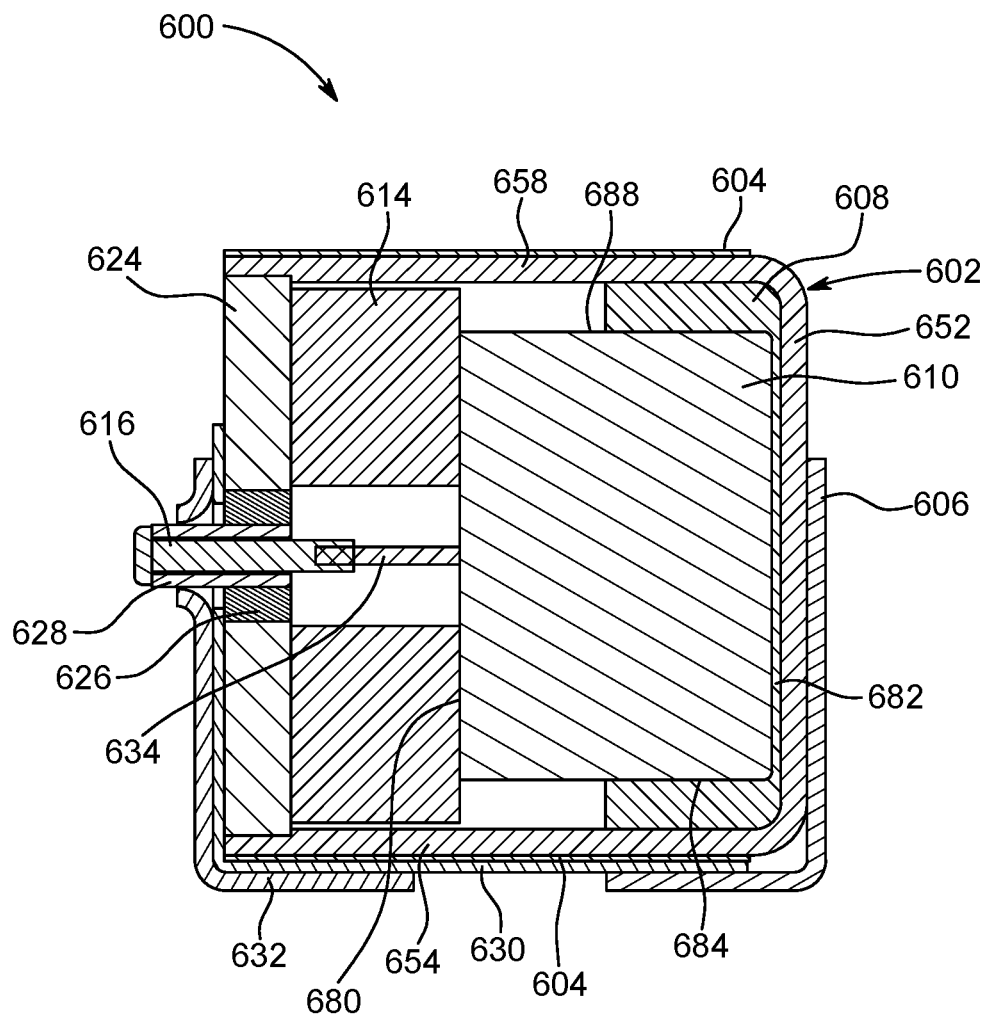
FIG. 7 is a cross section view of the hermitically sealed polymer capacitor of FIG. 6 taken along line C-C in FIG. 9A.
Figure 9A:
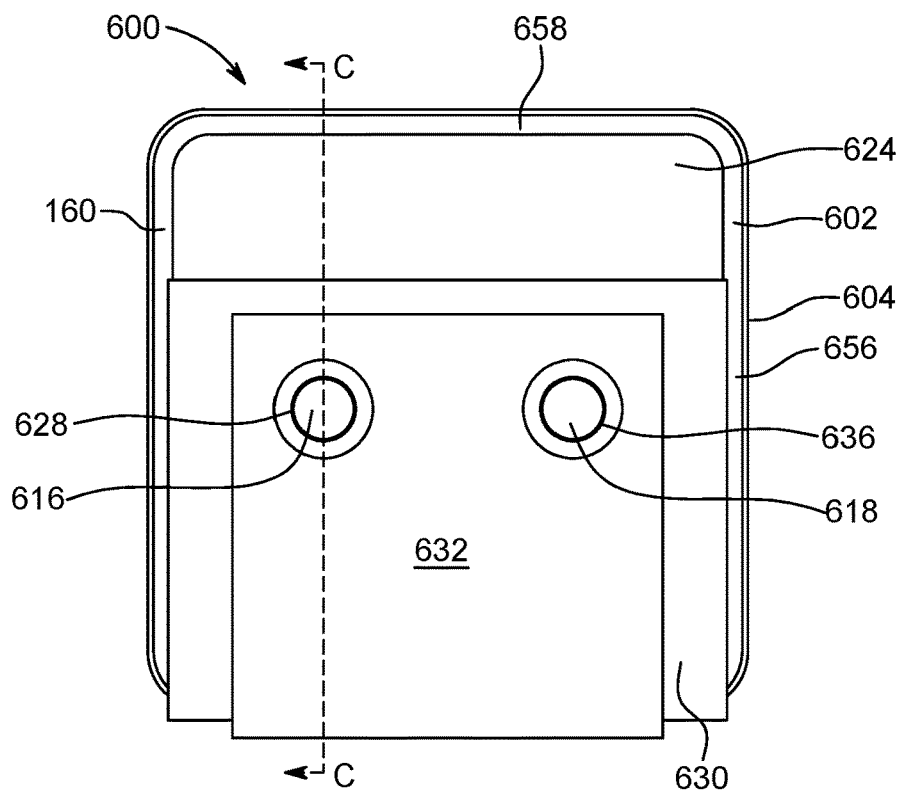
FIGS. 9A-9G are various views of the hermitically sealed polymer capacitor of FIG. 6.

Referring now to FIG. 7, a vertical cross section view of the hermetically sealed polymer capacitor 600 is shown. The vertical cross section view is from a line C-C as shown in FIG. 9A. FIG. 7 shows additional internal detail of the hermetically sealed capacitor 600. FIG. 7 shows the conductive paste 608 in contact with the inner surface of the lower side 654 of the case 602, the inner surface of the cathode end 652 of the case 602, the inner surface of the upper side 658 of the case, the base side 682 of the first capacitor element 610, the upper side 688 of the first capacitor element 610, and the lower side 684 of the first capacitor element 610. The conductive paste 608 does not extend to the anode end 680 of the first capacitor element 610.

The first anode wire 634 extends out from the anode end 680 of the first capacitor element 610. The first anode wire 634 and the first positive lead 616 extend through the optional bushing 614. The first positive lead 616 extends through the first metal tube 628, to which it is welded. The first metal tube 628 is located within the first glass insulator 626 of the GTMS 624. The cover 622 is welded to the case 602.

The upstanding first portion 631 of the anode insulator is located on the cover 622 and the generally horizontal lower portion 633 extends along the lower side 654 of the case 602 over the insulator 604. The upstanding first portion 631 extends upwards along the cover 622 above the part of the cover 622 including the GTMS 624. The generally horizontal lower portion 633 of the anode insulator 630 preferably extends along at least a portion of the lower side 654 of the case 602.

The anode terminal 632 is located on the anode insulator 630 and is in electrical communication with the first positive lead 616 via the first metal tube 628. The upstanding first portion 639 of the anode terminal 632 is located on the anode insulator 630 and the generally horizontal lower portion 641 extends along the lower side 654 of the case 602 over the anode insulator 630. The upstanding first portion 639 of the anode terminal 632 preferably has a smaller dimension that the first portion 631 of the anode insulator 630, such that the first portion 639 of the anode terminal 632 is completely insulated from the cover 622 by the first portion 631 of the anode insulator 630. The generally horizontal lower portion 641 of the anode terminal 632 preferably extends along at least a portion of the horizontal lower portion 633 of the anode insulator 630 and preferably extends towards the cathode end 652 of the case 602.

The cathode terminal 606 is preferably welded to the cathode end of the case 602 to form an electrical connection. The upstanding first portion 647 of the cathode terminal 606 is located on the cathode end 652 of the case 602 and the generally horizontal lower portion 649 extends along the lower side 654 of the case 602 over the anode insulator 630. The upstanding first portion 647 of the cathode terminal 606 extends along at least a portion of the cathode end 652 of the case 602. The generally horizontal lower portion 649 of the cathode terminal 606 preferably extends along at least a portion of the horizontal lower portion 633 of the anode insulator 630, and is separated from the anode terminal 632 by a gap.

Figure 8:
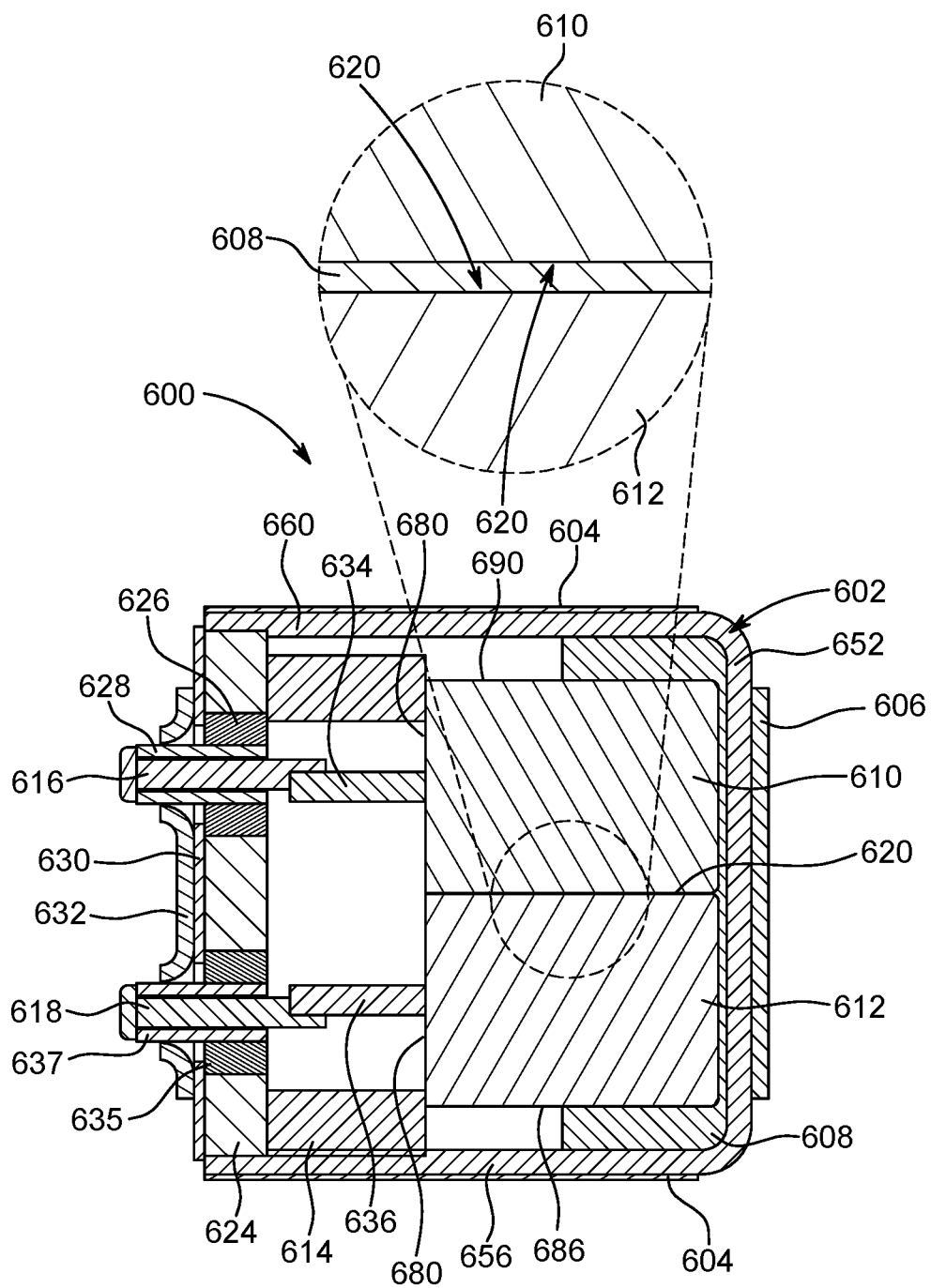
FIG. 8 is a cross section view of the hermitically sealed polymer capacitor of FIG. 6 taken along line D-D in FIG. 9C.

Referring now to FIG. 8, a horizontal cross section view of the hermetically sealed polymer capacitor 600 is shown. The horizontal cross section view is from a line D-D as shown in FIG. 9C. FIG. 8 shows the conductive paste 608 is preferably in contact with the inner surface of the first lateral side 656 of the case 602, the inner surface of the cathode end 652 of the case 602, the inner surface of the second lateral side 660 of the case, the base side 682 of the first capacitor element 610 and the second capacitor element 612, first lateral side 686 of the second capacitor element 612, and the second lateral side 690 of the first capacitor element 610. The conductive paste 608 preferably does not extend to the anode end 680 of the first capacitor element 610 and the second capacitor element 612.

The first anode wire 634 and the second anode wire 636 preferably extend out from the anode end 680 of the first capacitor element 610 and the second capacitor element 612. The first anode wire 634, the second anode wire 636, the first positive lead 616, and the second positive lead 618 preferably extend through the optional bushing 614. The first positive lead 616 and the second positive lead 618 preferably extend through the first metal tube 628 and the second metal tube 636, to which they are welded. The first metal tube 628 and the second metal tube 636 are preferably located within the first glass insulator 626 and the second glass insulator 634 of the GTMS 624. The cover 622 is preferably welded to the case 602.

The upstanding first portion 631 of the anode insulator is preferably located on the cover 622. The upstanding first portion 631 preferably extends upwards along the cover 622 above the part of the cover 622 including the GTMS 624.

The anode terminal 632 is preferably located on the anode insulator 630 and is preferably in electrical communication with the first positive lead 616 and the second positive lead 618 via the first metal tube 628 and the second metal tube 636. The upstanding first portion 639 of the anode terminal 632 is preferably located on the anode insulator 630 and preferably has a smaller dimension that the first portion 631 of the anode insulator 630, such that the first portion 639 of the anode terminal 632 is completely insulated from the cover 622 by the first portion 631 of the anode insulator 630.

The cathode terminal 606 is preferably welded to the cathode end of the case 602 to form an electrical connection. The upstanding first portion 647 of the cathode terminal 606 is preferably located on the cathode end 652 of the case 602. The upstanding first portion 647 of the cathode terminal 606 preferably extends along at least a portion of the cathode end 652 of the case 602. The insulator 604 is preferably located on the first lateral side 656 of the case 602 and the second lateral side 660 of the case 602.

The inset of FIG. 8 shows the gap between the first capacitor element 610 and the second capacitor element 612, which is preferably filled with the conductive paste 608. The inset shows the facing silvered anode portions 620 of the first capacitor element 610 and the second capacitor element 612.

Figure 9B:
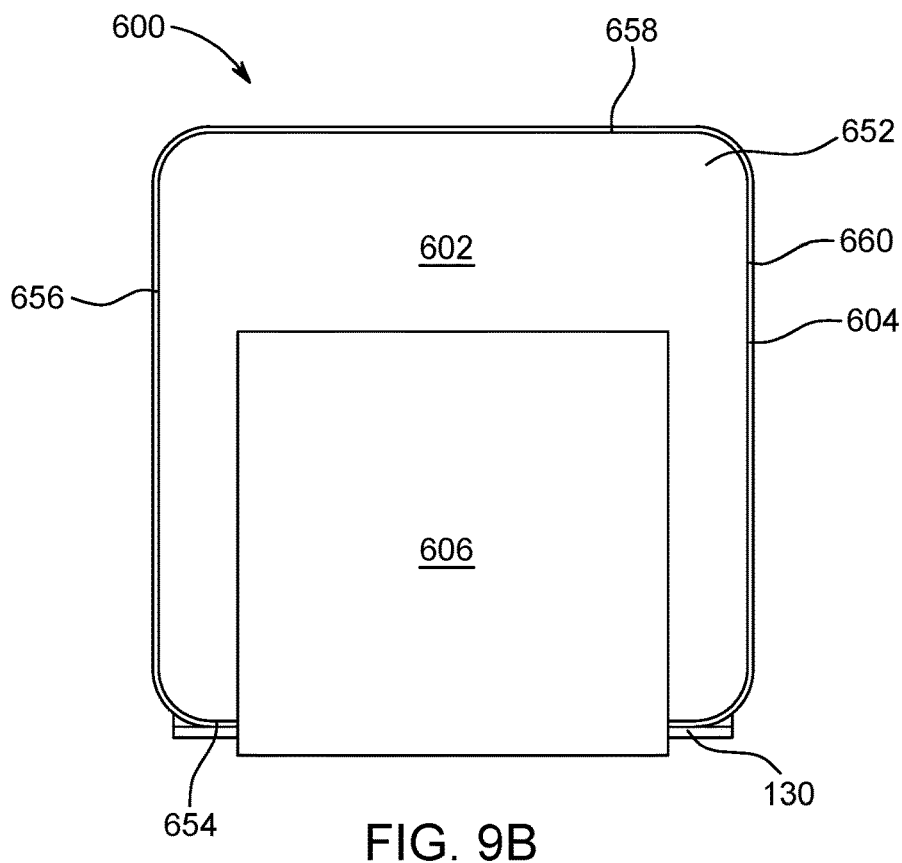
Figure 9C:
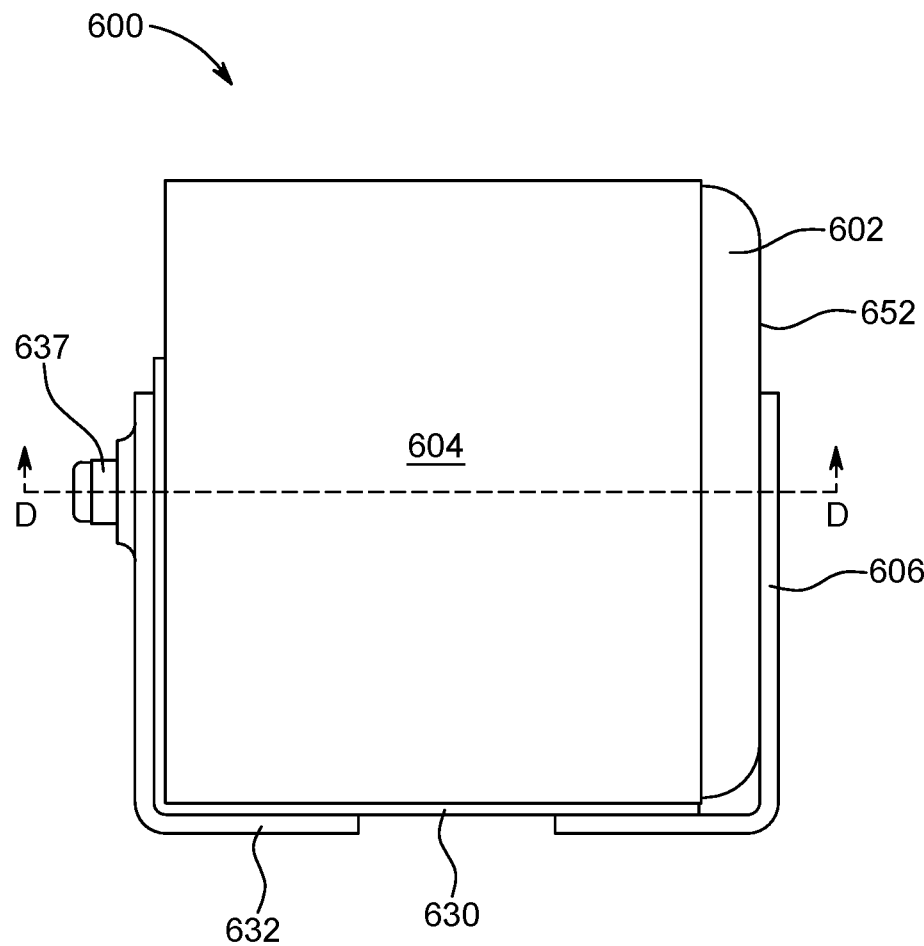
Figure 9D:
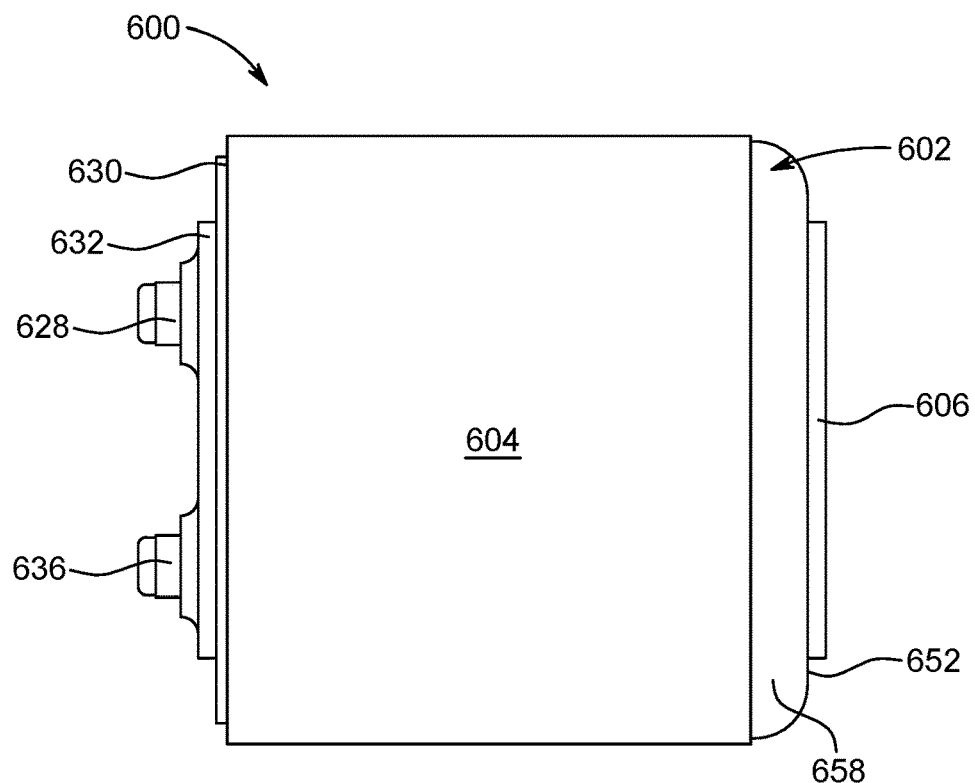
Figure 9E:
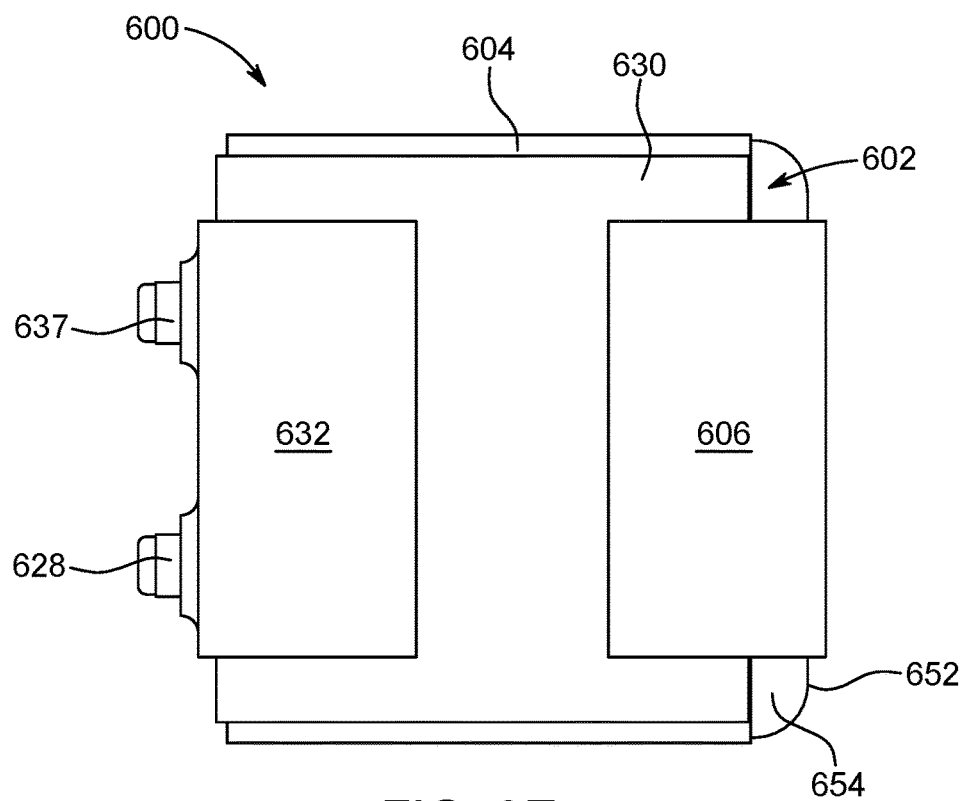
Figure 9F:
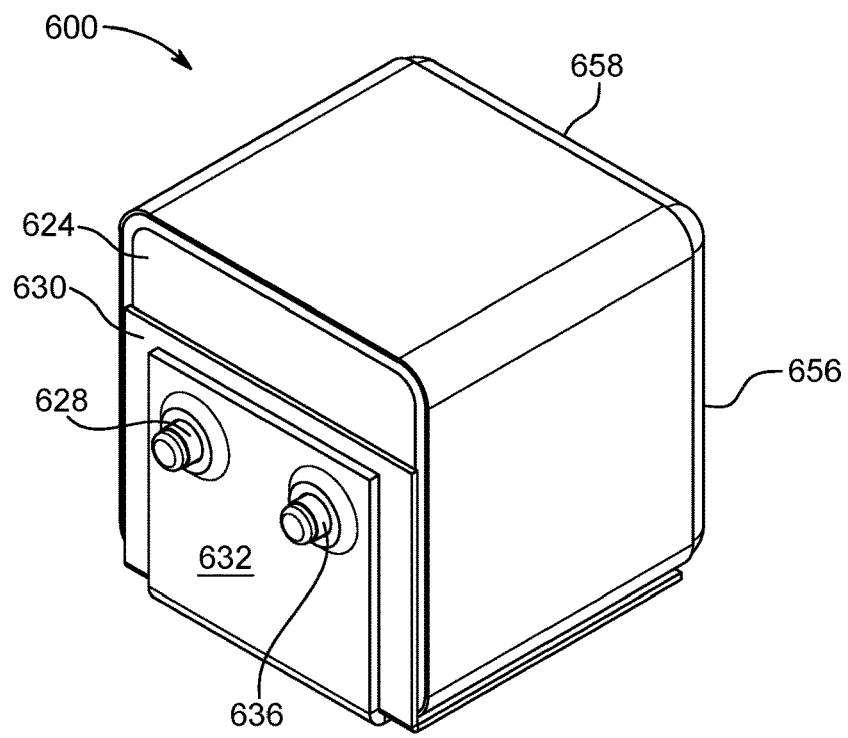
Figure 9G:
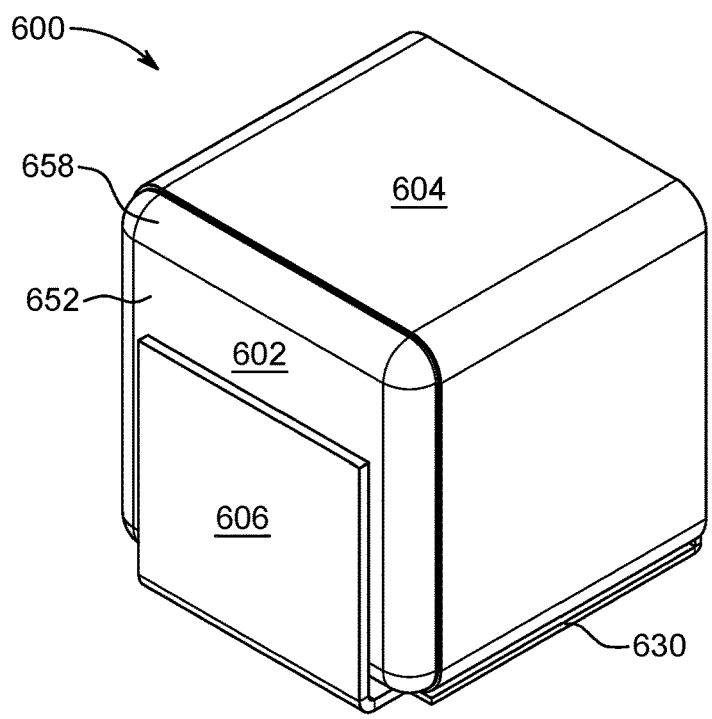

Referring now to FIGS. 9A-9G, different views of the hermetically sealed polymer capacitor 600 are shown. FIG. 9A is a front view of the hermetically sealed polymer capacitor 600 showing the anode end. FIG. 9B is a rear view of the hermetically sealed polymer capacitor 600 showing the cathode end. FIG. 9C is a side view of the hermetically sealed polymer capacitor 600. FIG. 9D is a top view of the hermetically sealed polymer capacitor 600 showing the upper side 658 of the case 602. FIG. 9E is a bottom view of the hermetically sealed polymer capacitor 600 showing the lower side 654 of the case 602 as described above. FIG. 9F is a perspective view of the front of the hermetically sealed polymer capacitor 600 showing the anode end. FIG. 9G is a perspective view of the rear of the hermetically sealed polymer capacitor 600 showing the cathode end.

Figure 10:
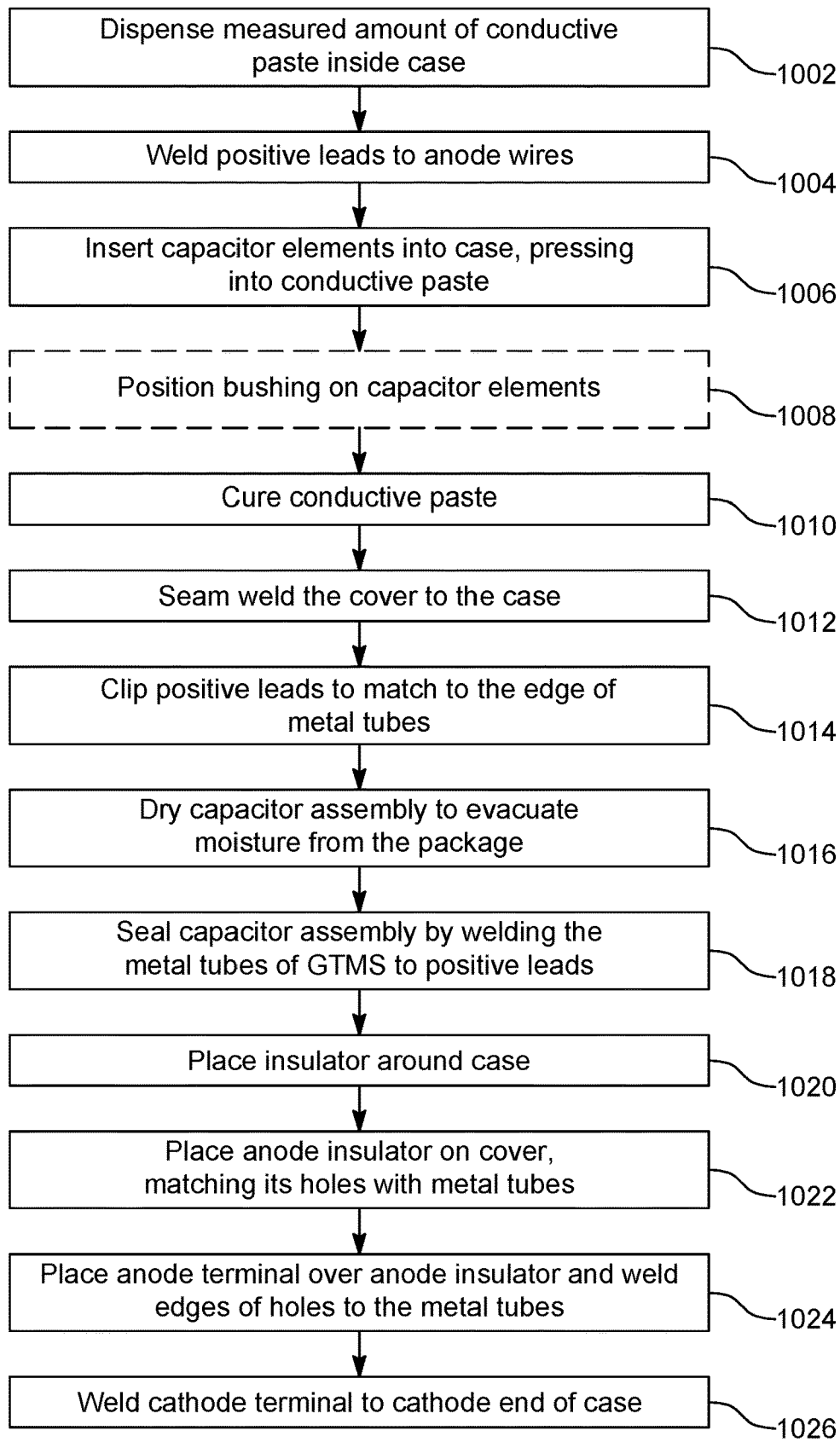
FIG. 10 is a flowchart illustrating a method of forming the hermitically sealed polymer capacitor of FIG. 6.

Referring now to FIG. 10, a flow chart illustrating a method of assembling the hermetically sealed polymer capacitor 600 is shown. In step 1002, a measured amount of the conductive paste 608 is preferably dispensed inside the case 602.

In step 1004, the first positive lead 616 is preferably welded to the first anode wire 634 and the second positive lead 618 is preferably welded to the second anode wire 636.

In step 1006, the first capacitor element 610 and the second capacitor element 612 is preferably inserted into the case 602 and pressed into the conductive paste 608. The first positive lead 616 and the second positive lead 618 may extend towards the anode end 650 of the case 602.

In optional step 1008, the bushing 614 is preferably placed on the first capacitor element 610 and the second capacitor element 612. The first positive lead 616 and the second positive lead 618 are preferably threaded through holes in the bushing 614.

The cover 622 is preferably placed on the anode end 650 of the case 602. The first positive lead 616 and the second positive lead 618 are preferably threaded through the first metal tube 628 and the second metal tube 637 of the one or more GTMS 624. In step 1010, the conductive paste 608 is preferably cured. In step 1012, the cover 622 is preferably seam welded to the case 602.

In step 1014, the first positive lead 616 and the second positive lead 618 are preferably clipped to the same length as the first metal tube 628 and the second metal tube 637.

In step 1016, the capacitor assembly is preferably dried to evacuate moisture from the package. In step 1018, after drying, the capacitor assembly is preferably sealed by welding the first positive lead 616 to the first metal tube 628 of the one or more GTMS 624 and welding the second positive lead 618 to the second metal tube 637 of the one or more GTMS 624.

In step 1020, the insulator 604 is preferably placed on the sides of the case 602. In step 1022, the anode insulator 630 is preferably placed on the cover 622, matching its holes with the first metal tube 628 and the second metal tube 637. In step 1024, the anode terminal 632 is preferably placed over the anode insulator 630 and edges of its holes are preferably welded to the first metal tube 628 and the second metal tube 637. In step 1026, the cathode terminal 606 is preferably welded to the cathode end of the case 602.

Figure 11:
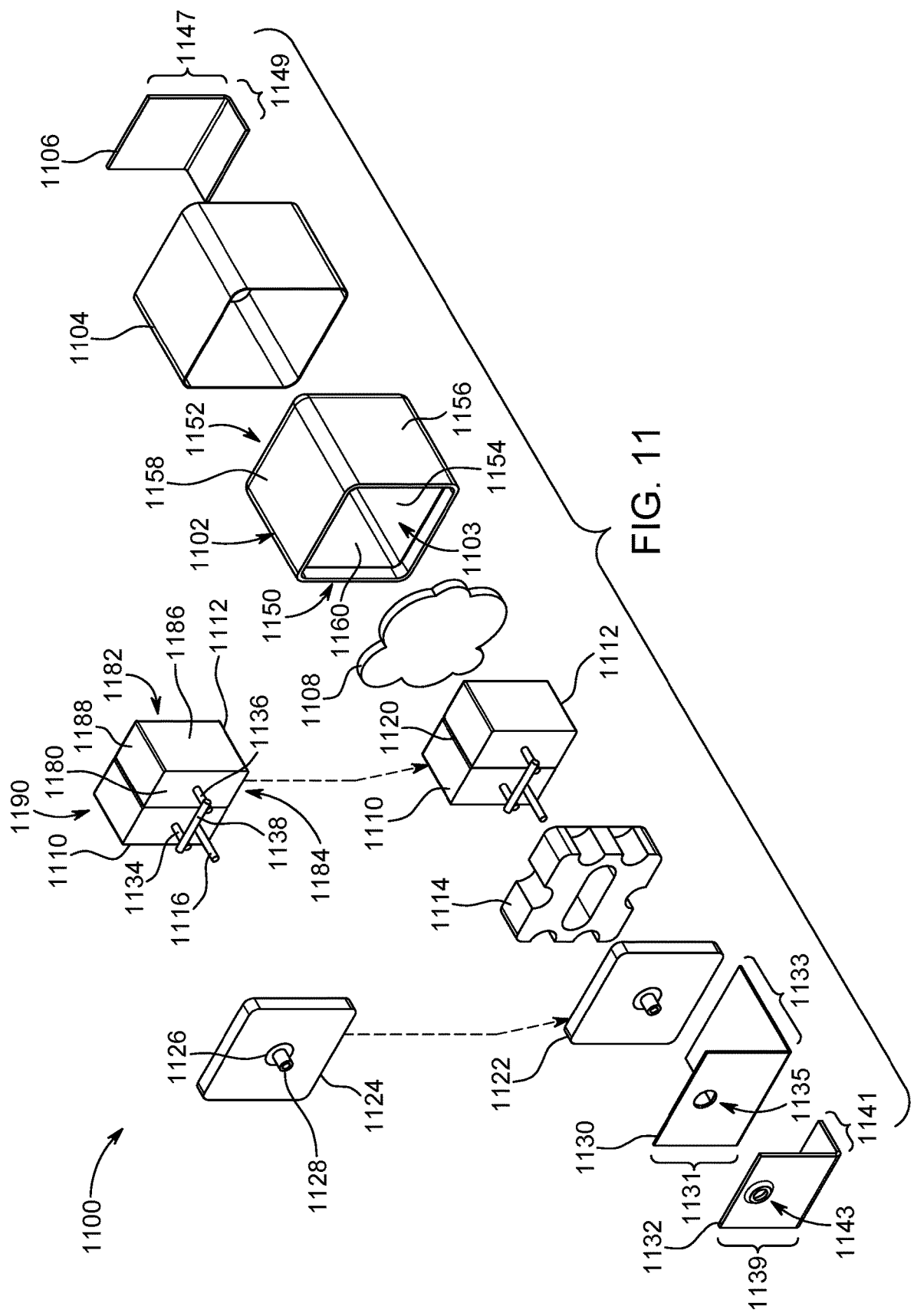
FIG. 11 is an exploded diagram illustrating components of another embodiment of a hermetically sealed polymer capacitor.

Referring now to FIG. 11, an exploded diagram illustrating components of another embodiment of a surface mount hermetically sealed polymer capacitor 1100 is shown. The hermetically sealed polymer capacitor 1100 preferably includes a case 1102. The case 1102 is preferably made of a metal, such as nickel, nickel based alloys, copper, copper based alloys, steel, titanium, and tantalum. The case 1102 is preferably electrically conductive.

As shown in the orientations depicted in FIGS. 11-14G, the case 1102 preferably includes an open anode end 1150, an opposite cathode end 1152, a lower side 1154, a first lateral side 1156, an upper side 1158, and a second lateral side 1160. The upper side 1158 and lower side 1154 are top and bottom walls that are opposite each other, and the first lateral side 1156 and second lateral side 1160 are side walls that are opposite each other. The open anode end 1150, the cathode end 1152, the lower side 1154, the upper side 1158, the first lateral side 1156, and the second lateral side 1160 may form an interior area 1103 of the case 1102.

The case 1102 preferably contains in the interior area 1103 a conductive paste 1108, a first capacitor element 1110 with a first anode wire 1134 and a second capacitor element 1112 with a second anode wire 1136. The first anode wire 1134 is preferably connected to the second anode wire 1138 via a cross wire 1138. A positive lead 1116 is preferably welded to the cross wire 1138. An optional bushing 1114 may be positioned toward the anode end 1150 of the case 1102.

The first capacitor element 1110 and the second capacitor element 1112 each preferably has an anode side 1180 corresponding to the anode end 1150 of the case 1102, a base side 1182 corresponding to the cathode end 1152 of the case 1102, a lower side 1184 corresponding to the lower side 1154 of the case 1102, a first lateral side 1186 corresponding to the first lateral side 1156 of the case 1102, an upper side 1188 corresponding to the upper side 1158 of the case, and a second lateral side 1190 corresponding to the second lateral side 1160 of the case 1102. It is noted that the sides can be considered faces or surfaces of the capacitor elements.

A quantity of the conductive paste 1108 is preferably applied to or supplied to the interior area 1103 of the case 1102 and may contact at least a portion of an inner surface of the cathode end 1152, and inner surface of the lower side 1154, an inner surface of the upper side 1158, an inner surface of the first lateral side 1156, and an inner surface of the second lateral side 1160. The conductive paste 1108 is initially preferably in an uncured and/or viscous and/or paste-like state. The conductive paste 1108 preferably comprises a conductive metal, such as Ag. In an example, the conductive paste 1108 preferably comprises Ag flakes in an inorganic silicate aqueous composition. In another example, the conductive paste 1108 preferably comprises an Ag epoxy. A quantity or measured amount of the conductive paste 1108 is preferably dispensed in the interior area of the case 1102. The first capacitor element 1110 and the second capacitor element 1112 are preferably inserted into the case 1102 and pressed down into or otherwise disposed in contact with the conductive paste 1108. The conductive paste 1108 may thereby distribute itself, filling an available volume between any gaps provided between the first capacitor element 1110 and the second capacitor element 1112 and inner surface of the case 1102. The conductive paste 1108 is configured to be cured and hardened, as discussed further herein.

The quantity of the conductive paste 1108 should be sufficient to cover at least portions of surfaces of the first capacitor element 1110 and the second capacitor element 1112. The conductive paste 1108 preferably covers the base side 1182 of the first capacitor element 1110 and the second capacitor element 1112 and all or some of, such by way of illustration as approximately 5% to approximately 99% of the lower side 1184, the first lateral side 1186, the upper side 1188, and the second lateral side 1190. The conductive paste 1108 preferably does not extend to the anode side 1180 680 as contact with the anode wire could result in a short. The surfaces covered by the conductive paste 108 may be referred to as silvered anode surfaces.

The first capacitor element 1110 is preferably coupled to the second capacitor element 1112 as previously described. The first capacitor element 1110 is preferably electrically connected to the second capacitor element 1112 in parallel by the cross wire 1138 welded to the first anode wire 1134 and the second anode wire 1136. The first capacitor element 1110 is preferably separated from the second capacitor element 1112 by a portion of the conductive paste 1108 filling any gaps between the first capacitor element 1110 and the second capacitor element 1112. The first capacitor element 1110 is preferably electrically connected to the second capacitor element 1112 in parallel through facing silvered anode portions 1120. The conductive paste 1108 is preferably cured in order to provide reliable mechanical and electrical connection between outer surface of the first capacitor element 1110 and the second capacitor element 1112 and the case 1102. In an illustrative example, the conductive paste 1108 may be cured at approximately 80° C. to approximately 200° C. for approximately 0.25 hours to approximately 3 hours. After curing, the conductive paste 1108 is preferably substantially solid.

The first capacitor element 1110 and the second capacitor element 1112 are preferably composed of a sintered tantalum slug. The sintered tantalum slug is preferably electrochemically oxidized to create a tantalum pentoxide dielectric layer on an outer surface of the tantalum slug layer and then is preferably covered with one or more electrically conductive polymer layers to form the capacitor elements. Such polymer layers may comprise, but are not limited to, polypyrrole, polyaniline, PEDOT, and other similar materials as are known to those in the relevant art.

The first anode wire 1134 may protrude from the anode side 1180 of the first capacitor element 1110 and preferably extends towards the anode end 1150 of the case 1102. The anode end 1150 of the case 1102 is preferably opposite the cathode end 1152 of the case 1102. The first anode wire 1134 preferably comprises a wire protruding from the sintered tantalum slug. The first anode wire 1134 preferably comprises tantalum. The first anode wire 1134 is preferably pressed into the tantalum slug during sintering or welded to the tantalum slug after sintering. The second anode wire 1136 may protrude from the anode side 1180 of the second capacitor element 1112 and preferably extends towards the anode end 1150 of the case 1102. The second anode wire 1136 preferably comprises a wire protruding from the sintered tantalum slug. The second anode wire 1136 preferably comprises tantalum. The second anode wire 1136 is preferably pressed into the tantalum slug during sintering or welded to the tantalum slug after sintering. The first anode wire 1134 and the second anode wire 1136 are preferably substantially cylindrical in cross-section and may have a substantially straight length.

The cross wire 1138 preferably comprises one or more of nickel, copper, steel, titanium, tantalum, and/or alloys thereof. The cross wire 1138 is preferably welded to the first anode wire 1134 and the second anode wire 1136. The positive lead 1116 preferably comprises one or more of nickel, copper, steel, titanium, tantalum, and/or alloys thereof. The cross wire 1138 and the positive lead 1116 are preferably substantially cylindrical in cross-section and may have a substantially straight length.

If a bushing 1114 is included in the case 1102, it is preferably positioned between the first capacitor element 1110 and the second capacitor element 1112 and a cover 1122 positioned on the anode end 1150 of the case 1102. The bushing 1114 may comprise an insulating material such as rubber or plastic. The bushing 1114 preferably comprises one or more of PTFE, Kapton®, PE, and PPP. The bushing 1114 is preferably shaped in a way that allows the positive lead 1116 to pass through one or more openings in the bushing 1114. It is noted that in certain variations, a bushing may not be used.

The cover 1122 preferably closes off the open anode end 1150 of the case 1102, and preferably comprises a metal, such as steel, nickel, copper, steel, titanium, tantalum, and/or alloys thereof. The cover 1122 is preferably a generally flat panel or wall shaped to fit in and cover the open end 1150 of the case 1102. The cover 1122 preferably has a first hole corresponding to a location and dimension of the positive lead 1116. The combination of the case 1102 and the cover 1122 may be referred to as the capacitor body or device body.

The cover 1122 preferably includes a GTMS 1124. The GTMS 1124 preferably includes a glass insulator 1126 and a metal tube 1128. The glass insulator 1126 is preferably positioned in the hole of the cover 1122. The positive lead 1116 may extend through the glass insulator 1126, which insulates it from the cover 1122. The metal tube 1128 preferably comprises one or more of nickel, copper, steel, titanium, tantalum, and/or alloys thereof. The positive lead 1116 may extend through the metal tube 1128 and is preferably clipped to the same length. The cover 1122 is preferably seam welded to the case 1102.

Prior to the sealing of the GTMS 1124 by welding the metal tube 1128 to the positive lead 1116, the capacitor body is preferably dried out in order to evacuate moisture from the interior area 1103, the first capacitor element 1110, the second capacitor element 1112, and the conductive paste 1108. The capacitor body is preferably dried at approximately 120° C. to approximately 180° C. for approximately 2 hours to 8 hours in order to evacuate moisture from the capacitor body.

After the drying process, the device is preferably sealed by welding the cover 1112 over the open anode end of the case 1102 and welding the metal tube 1128 to the positive lead 1116 to form a package. The package is preferably hermetically sealed. The final moisture content of the components inside the case 1102 is preferably approximately less than approximately 25% relative humidity at approximately 20° C. to 30° C.

The case 1102 is preferably sheathed in an insulator 1104, which may be an insulative sleeve. The insulator 1104 may surround the lower side 1154, the first lateral side 1156, the upper side 1158, and the second lateral side 1160 of the case 1102, leaving the cathode end 1152 of the case 1102 and the cover 1122 exposed. The insulator 104 preferably comprises a polyimide film, PTFE, FEP, VITON™, PVC, polyurethane, and others.

An anode insulator 1130 is preferably positioned on the cover 1122, and may be formed as an insulative shim. The anode insulator 1130 is preferably generally L-shaped, with an upstanding first portion 1131 on the cover 1122 and a generally horizontal lower portion 1133 extending along the lower side 1154 of the case 1102 over the insulator 1104, although other shapes may be employed. The upstanding first portion 1131 extends upwards along the cover 1122 above the part of the cover 1122 including the GTMS 1124. The generally horizontal lower portion 1133 of the anode insulator 1130 preferably extends along at least a portion of the lower side 1154 of the case 1102. The anode insulator 1130 may have a hole 1135 corresponding to the location and dimension of the positive lead 1116 and the metal tube 1128. The hole 1135 preferably allows the positive lead 1116 and the metal tube 1128 to pass through and may also assist in aligning the positive lead 1116 and the metal tube 1128. The anode insulator 1130 may comprise an insulating material such as a rubber, plastic, or Teflon™. The anode insulator 1130 preferably comprises one or more of PTFE, Polyimide, PE, and PPP.

An anode terminal 1132 is preferably placed over the anode insulator 1130 and is in electrical communication with the positive lead 1116 via the metal tubes of the GTMS 1124. The anode terminal 1132 is preferably generally L-shaped, with an upstanding first portion 1139 on the anode insulator 1130 and a generally horizontal lower portion 1141 extending along the lower side 1154 of the case 1102 over the anode insulator 1130, although other shapes may be employed. The upstanding first portion 1139 of the anode terminal 1132 preferably has a smaller dimension that the first portion 1131 of the anode insulator 1130, such that the first portion 1139 of the anode terminal 1132 is completely insulated from the cover 1122 by the first portion 1131 of the anode insulator 1130. The generally horizontal lower portion 1141 of the anode terminal 1132 preferably extends along at least a portion of the horizontal lower portion 1133 of the anode insulator 1130 preferably extends towards the cathode end 1152 of the case 1102. The anode terminal 1132 preferably comprises a metal, such as nickel, nickel based alloys, copper, and copper based alloys. The anode terminal 1132 may be soldered/plated with tin, lead, palladium, gold, and/or alloys thereof. The anode terminal 1132 forms a surface mount terminal for the hermetically sealed capacitor 1100.

The anode terminal 1132 preferably has a hole 1143 corresponding to the location and dimension of the positive lead 1116 and the metal tube 1128. The hole 1143 may allow the positive lead 1116 and the first metal tube 1128 to pass through. The edges of the hole 1143 are preferably welded to the first metal tube 1128 to form an electrical connection.

A cathode terminal 1106 is preferably welded to the cathode end of the case 1102 to form an electrical connection. The cathode terminal 1106 is preferably generally L-shaped, with an upstanding first portion 1147 on the cathode end of the case 1102 and a generally horizontal lower portion 1149 extending along the lower side 1154 of the case 1102 over the anode insulator 1130, although other shapes may be employed. The upstanding first portion 1147 of the cathode terminal 1106 extends along at least a portion of the cathode end 1152 of the case 1102. The generally horizontal lower portion 1149 of the cathode terminal 1106 preferably extends along at least a portion of the horizontal lower portion 1133 of the anode insulator 1130, and is separated from the anode terminal 1132 by a gap. The cathode terminal 1106 preferably comprises a metal, such as nickel, nickel based alloys, copper, and copper based alloys. The cathode terminal 1106 may be soldered/plated with tin, lead, palladium, gold, and/or alloys thereof. The cathode terminal 1106 forms a surface mount terminal for the hermetically sealed capacitor 1100.

Figure 12:
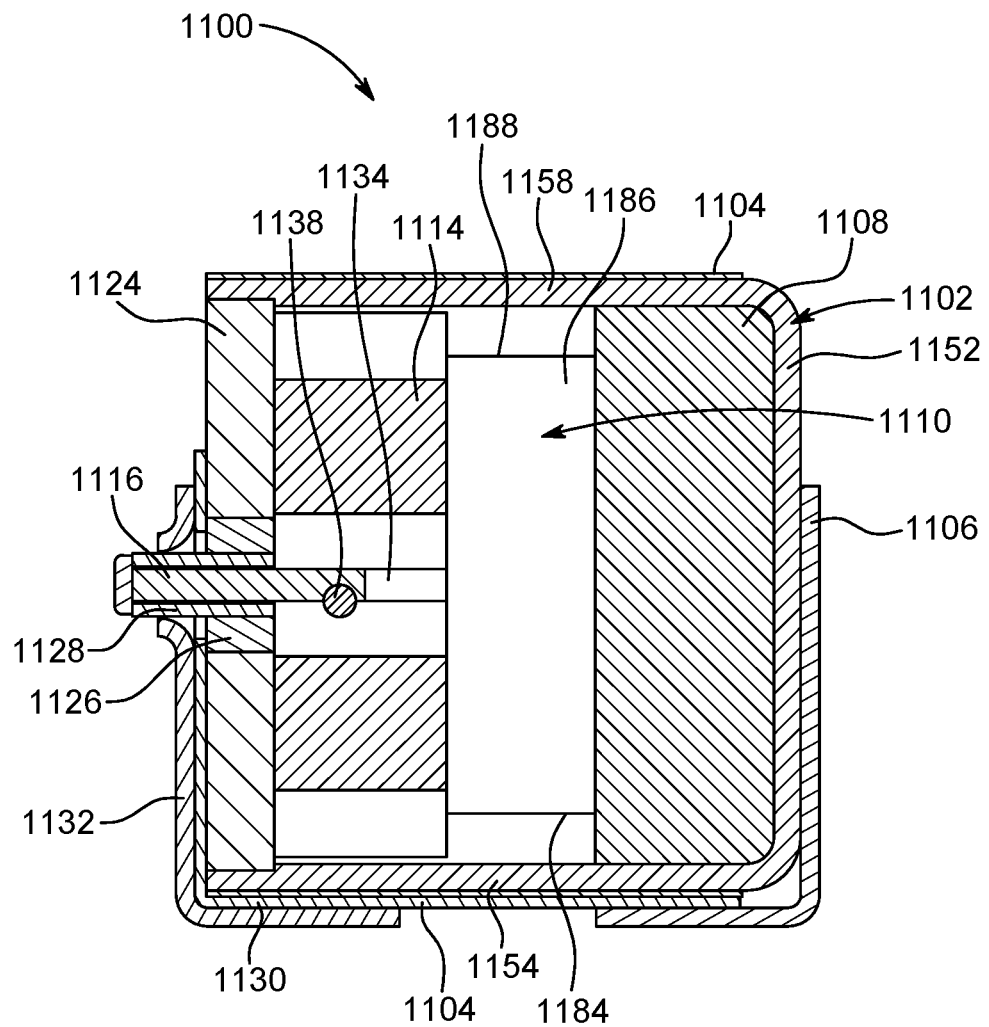
FIG. 12 is a cross section view of the hermitically sealed polymer capacitor of FIG. 11 taken along line E-E in FIG. 14A.
Figure 14A:
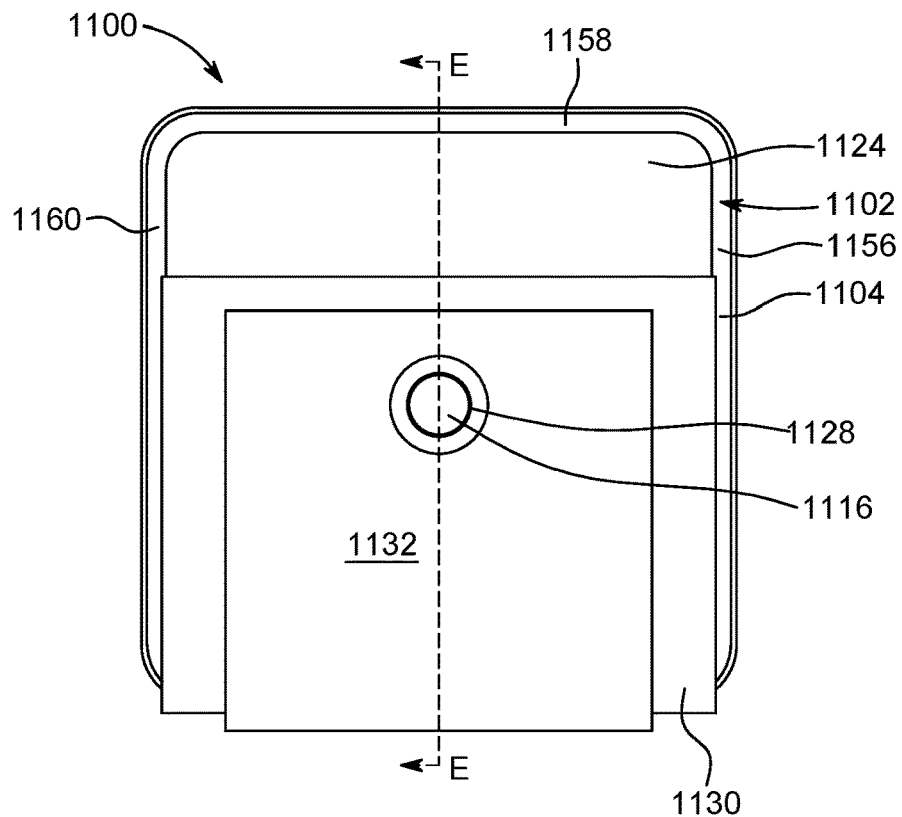
FIGS. 14A-14G are various views of the hermetically sealed polymer capacitor of FIG. 11.
Figure 14B:
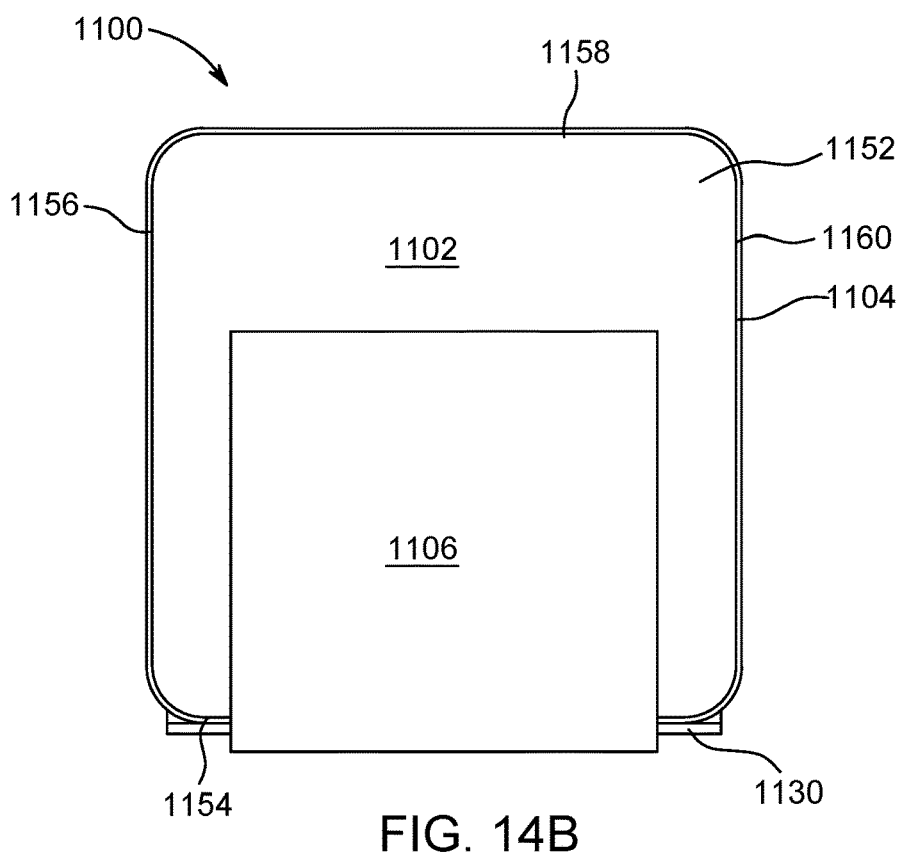

Referring now to FIG. 12, a vertical cross section view of the hermitically sealed polymer capacitor 1100 is shown. The vertical cross section view may from a line E-E as shown in FIG. 14A. FIG. 12 shows additional internal detail of the hermetically sealed capacitor 1100. FIG. 7 shows the conductive paste 1108 in contact with a the inner surface of the lower side 1154 of the case 1102, the inner surface of the cathode end 1152 of the case 1102, and the inner surface of the upper side 1158 of the case. The conductive paste 1108 is preferably in contact with the first lateral side 1186 of the first capacitor element 1110, the base side 1182 of the first capacitor element 1110, the upper side 1188 of the first capacitor element 1110, and the lower side 1184 of the first capacitor element 1110. The conductive paste 1108 does not extend to the anode end 1180 of the first capacitor element 1110.

The anode wire 1134 extends out from the anode end 1180 of the first capacitor element 1110. The anode wire 1134, the cross wire 1138, and the positive lead 1116 extend through the optional bushing 1114. The positive lead 1116 extends through the metal tube 1128, to which it is welded. The metal tube 1128 is located within the first glass insulator 1126 of the GTMS 1124. The cover 1122 is welded to the case 1102.

The upstanding first portion 1131 of the anode insulator is located on the cover 1122 and the generally horizontal lower portion 1133 extends along the lower side 1154 of the case 1102 over the insulator 1104. The upstanding first portion 1131 extends upwards along the cover 1122 above the part of the cover 1122 including the GTMS 1124. The generally horizontal lower portion 1133 of the anode insulator 1130 preferably extends along at least a portion of the lower side 1154 of the case 1102.

The anode terminal 1132 is located on the anode insulator 1130 and is in electrical communication with the positive lead 1116 via the metal tube 1128. The upstanding first portion 1139 of the anode terminal 1132 is located on the anode insulator 1130 and the generally horizontal lower portion 1141 extends along the lower side 1154 of the case 1102 over the anode insulator 1130. The upstanding first portion 1139 of the anode terminal 1132 preferably has a smaller dimension that the first portion 1131 of the anode insulator 1130, such that the first portion 1139 of the anode terminal 1132 is completely insulated from the cover 1122 by the first portion 1131 of the anode insulator 1130. The generally horizontal lower portion 1141 of the anode terminal 1132 preferably extends along at least a portion of the horizontal lower portion 1133 of the anode insulator 1130 and preferably extends towards the cathode end 1152 of the case 1102.

The cathode terminal 1106 is preferably welded to the cathode end of the case 1102 to form an electrical connection. The upstanding first portion 1147 of the cathode terminal 1106 is located on the cathode end 1152 of the case 1102 and the generally horizontal lower portion 1149 extends along the lower side 1154 of the case 1102 over the anode insulator 1130. The upstanding first portion 1147 of the cathode terminal 1106 extends along at least a portion of the cathode end 1152 of the case 1102. The generally horizontal lower portion 1149 of the cathode terminal 1106 preferably extends along at least a portion of the horizontal lower portion 1133 of the anode insulator 1130, and is separated from the anode terminal 1132 by a gap.

Figure 13:
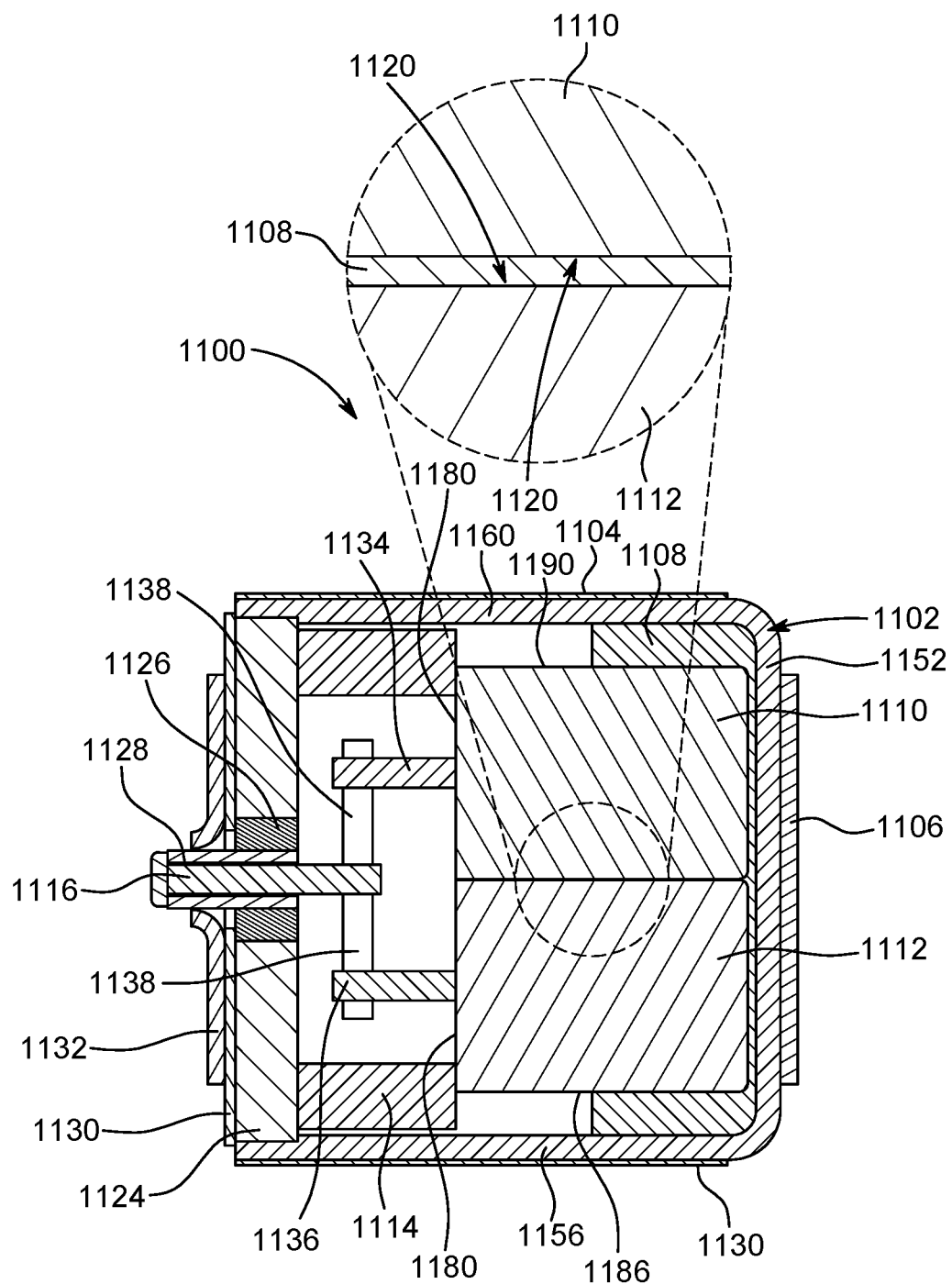
FIG. 13 is a cross section view of the hermitically sealed polymer capacitor of FIG. 11 taken along line F-F in FIG. 14C.
Figure 14C:
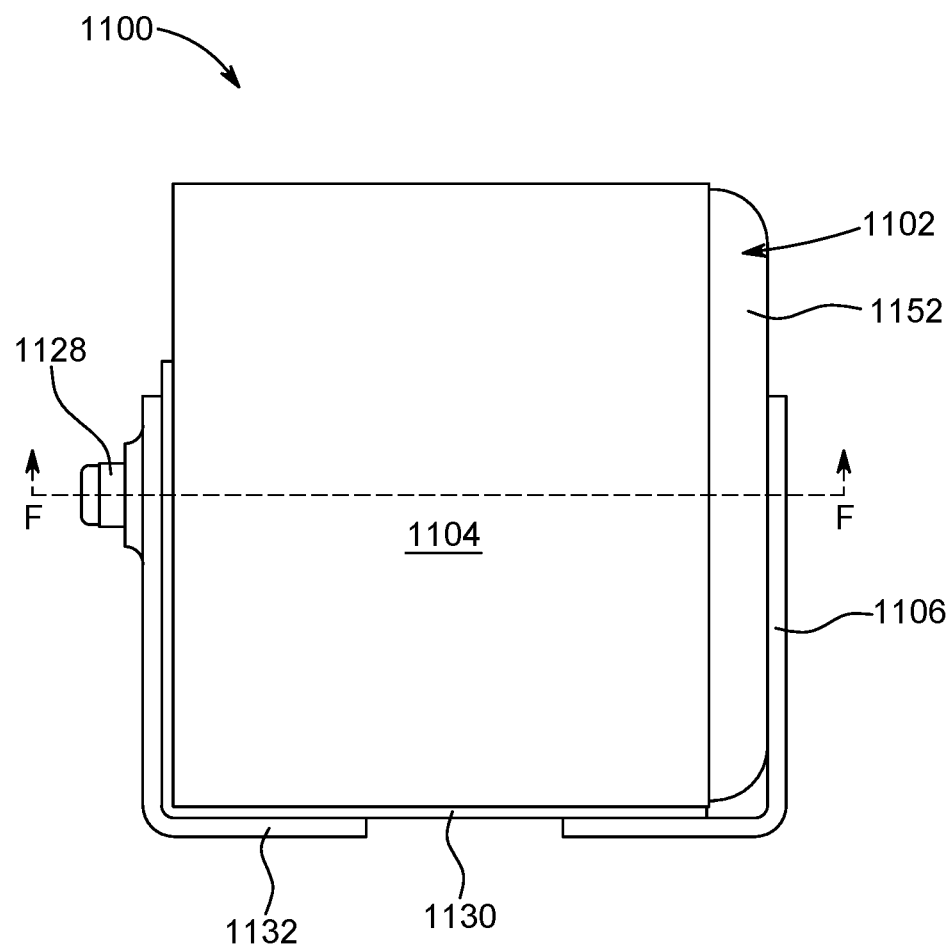
Figure 14D:
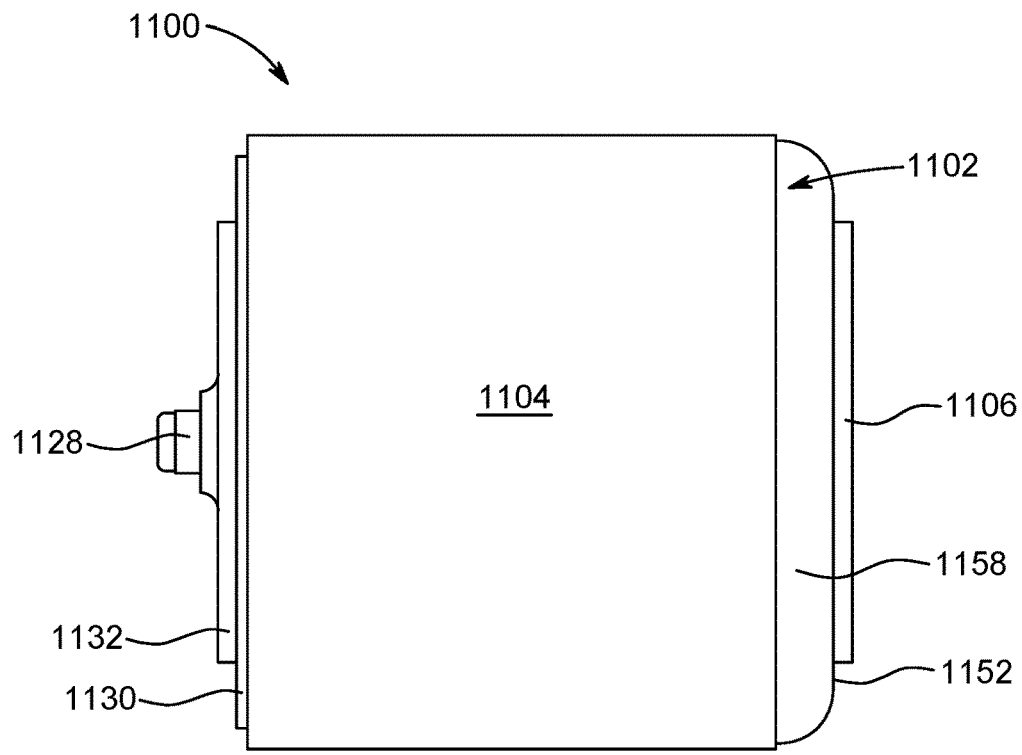
Figure 14E:
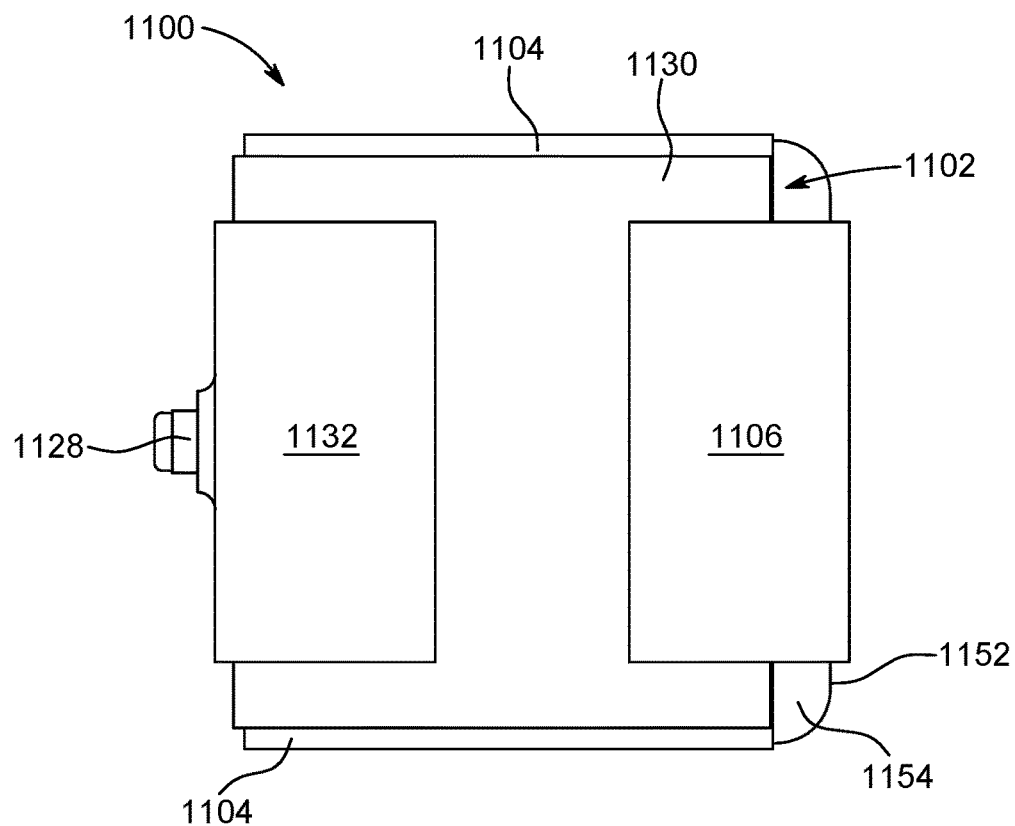
Figure 14F:
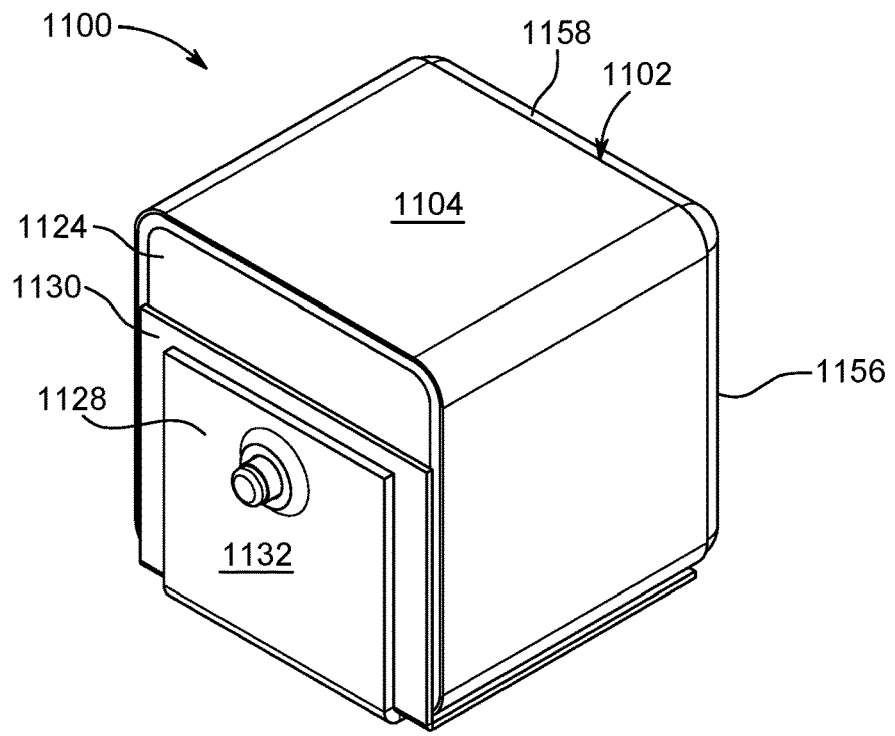
Figure 14G:
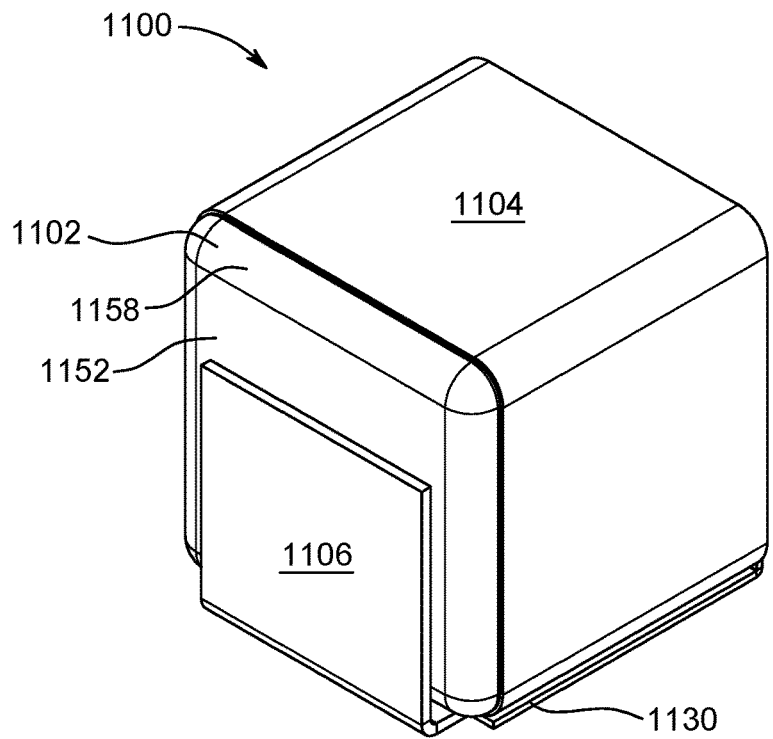

Referring now to FIG. 13, a horizontal cross section view of the hermetically sealed polymer capacitor 1100 is shown. The horizontal cross section view may from a line F-F as shown in FIG. 14C. FIG. 13 shows the conductive paste 1108 is preferably in contact with the inner surface of the first lateral side 1156 of the case 1102, the inner surface of the cathode end 1152 of the case 1102, the inner surface of the second lateral side 1160 of the case, the base side 1182 of the first capacitor element 1110 and the second capacitor element 1112, first lateral side 1186 of the second capacitor element 1112, and the second lateral side 1190 of the first capacitor element 1110. The conductive paste 1108 preferably does not extend to the anode end 1180 of the first capacitor element 1110 and the second capacitor element 1112.

The first anode wire 1134 and the second anode wire 1136 preferably extend out from the anode end 1180 of the first capacitor element 1110 and the second capacitor element 1112. The first anode wire 1134, the second anode wire 1136, the cross wire 1138, and the positive lead 1116 preferably extend through the optional bushing 1114. The positive lead 1116 preferably extends through the metal tube 1128, to which it is welded. The metal tube 1128 is preferably located within the glass insulator 1126 of the GTMS 1124. The cover 1122 is preferably welded to the case 1102.

The upstanding first portion 1131 of the anode insulator is preferably located on the cover 1122. The upstanding first portion 1131 preferably extends upwards along the cover 1122 above the part of the cover 1122 including the GTMS 1124.

The anode terminal 1132 is preferably located on the anode insulator 1130 and is preferably in electrical communication with the positive lead 1116 via the metal tube 1128. The upstanding first portion 1139 of the anode terminal 1132 is preferably located on the anode insulator 1130 and preferably has a smaller dimension that the first portion 1131 of the anode insulator 1130, such that the first portion 1139 of the anode terminal 1132 is completely insulated from the cover 1122 by the first portion 1131 of the anode insulator 1130.

The cathode terminal 1106 is preferably welded to the cathode end of the case 1102 to form an electrical connection. The upstanding first portion 1147 of the cathode terminal 1106 is preferably located on the cathode end 1152 of the case 1102. The upstanding first portion 1147 of the cathode terminal 1106 preferably extends along at least a portion of the cathode end 1152 of the case 1102. The insulator 1104 is preferably located on the first lateral side 1156 of the case 1102 and the second lateral side 1160 of the case 1102.

The inset of FIG. 13 shows the gap between the first capacitor element 1110 and the second capacitor element 1112, which is preferably filled with the conductive paste 1108. The inset shows the facing silvered anode portions 1120 of the first capacitor element 1110 and the second capacitor element 1112.

Referring now to FIGS. 14A-14G, different views of the hermetically sealed polymer capacitor 1100 are shown. FIG. 9A is a front view of the hermetically sealed polymer capacitor 1100 showing the anode end. FIG. 9B is a rear view of the hermetically sealed polymer capacitor 1100 showing the cathode end. FIG. 9C is a side view of the hermetically sealed polymer capacitor 1100. FIG. 9D is a top view of the hermetically sealed polymer capacitor 1100 showing the upper side 1158 of the case 1102. FIG. 9E is a bottom view of the hermetically sealed polymer capacitor 1100 showing the lower side 1154 of the case 1102 as describe above. FIG. 9F is a perspective view of the front of the hermetically sealed polymer capacitor 1100 showing the anode end. FIG. 9G is a perspective view of the rear of the hermetically sealed polymer capacitor 1100 showing the cathode end.

Figure 15:
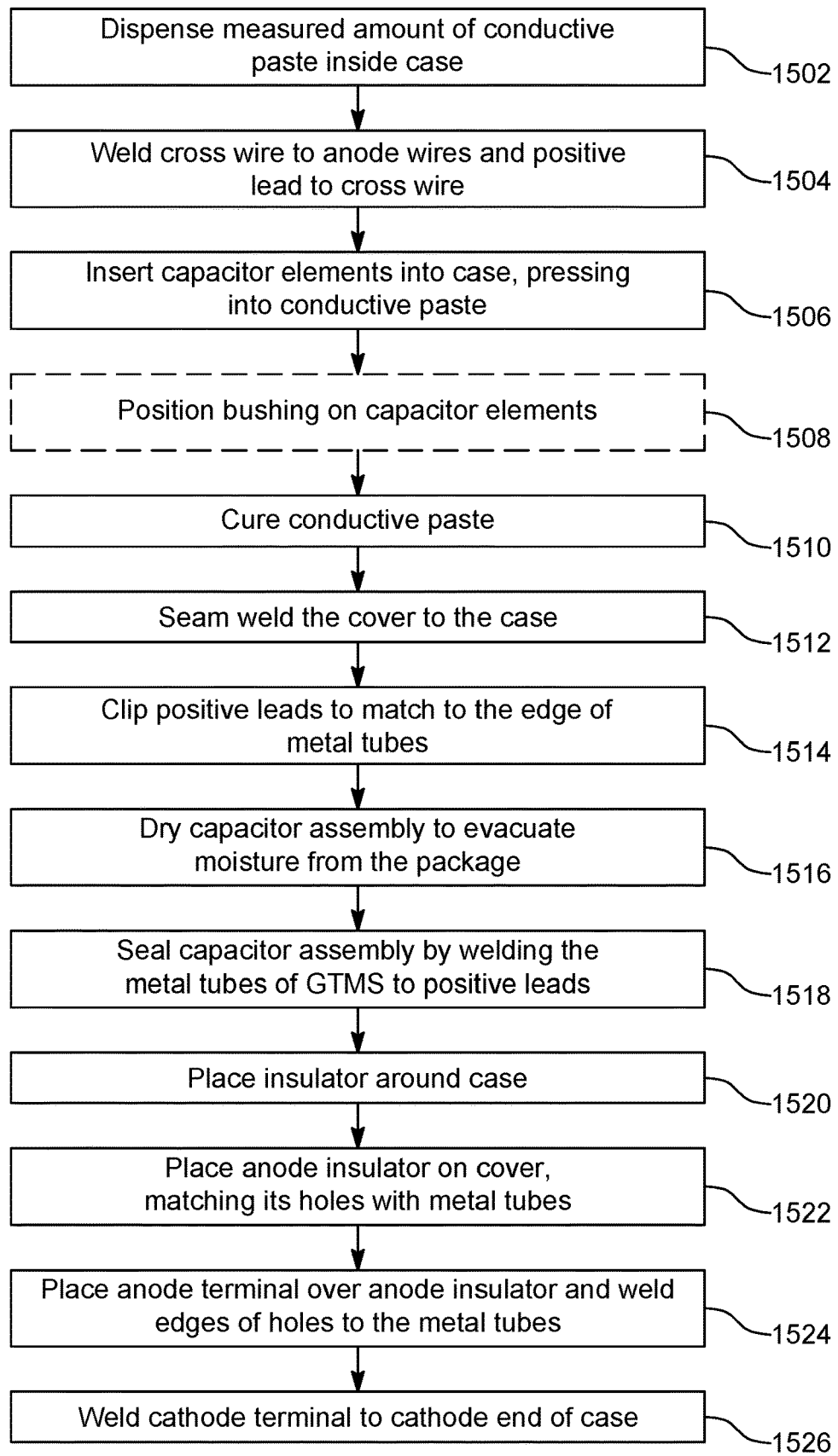
FIG. 15 is a flowchart illustrating a method of forming the hermetically sealed polymer capacitor of FIG. 11.

Referring now to FIG. 15, a flow chart illustrating a method of assembling the hermetically sealed polymer capacitor 1100 is shown. In step 1502, a measured amount of the conductive paste 1108 is preferably dispensed inside the case 1102.

In step 1504, the first anode wire 1134 and the second anode wire 1136 are preferably welded to the cross wire 1138. The positive lead 1116 is preferably welded to the cross wire 1138.

In step 1506, the first capacitor element 1110 and the second capacitor element 1112 are preferably inserted into the case 1102 and pressed into the conductive paste 1108. The positive lead 1116 may extend towards the anode end 1150 of the case 1102.

In optional step 1508, the bushing 1114 is preferably placed on the first capacitor element 1110 and the second capacitor element 1112. The positive lead 1116, cross wire 1138, the first anode wire 1134, and the second anode wire 1136 are preferably threaded through a hole in the bushing 1114.

The cover 1122 is preferably placed on the case. The positive lead 1116 is preferably threaded through the metal tube 1128 of the GTMS 1124.

In step 1510, the conductive paste 1108 is preferably cured. In step 1512, the cover 1112 is preferably seam welded to the case 1102.

In step 1514, the positive lead 1116 is preferably clipped to the same length as the metal tube 1128.

In step 1516, the capacitor assembly is preferably dried to evacuate moisture from the package. In step 1518, after drying, the capacitor assembly is preferably sealed by welding the positive lead 1116 to the metal tube 1128 of the GTMS 1124.

In step 1520, the insulator 1104 is preferably placed on the sides of the case 1102. In step 1522, the anode insulator 1130 is preferably placed on the cover 1122, matching its hole with the metal tube 1128. In step 1524, the anode terminal 1132 is preferably placed over the anode insulator 1130 and edges of its hole are preferably welded to the metal tube 1128. In step 1526, the cathode terminal 1106 is preferably welded to the bottom portion of the case 1102.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. The preferred embodiments of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the appended claims.

What is claimed is:

1. A hermetically sealed polymer capacitor comprising:
   a capacitor body having an interior area and a cathode end and an anode end, the capacitor body comprising a case having an opening at the anode end, and a cover welded at the anode end;
   a first capacitor element and a second capacitor element positioned within the interior area, the first capacitor element and the second capacitor element positioned adjacent to each other with a gap provided between the first capacitor element and the second capacitor element;
   a quantity of conductive paste initially provided within the interior area in an uncured state and configured to harden in a cured state, the conductive paste in contact with the first capacitor element and the second capacitor element,
   wherein at least a portion of the conductive paste is in contact with an inner surface of the capacitor body and a surface of the first capacitor element, at least a portion of the conductive paste is at least partially positioned between the inner surface of the capacitor body and a surface of the second capacitor element, and at least a portion of the conductive paste is at least partially positioned within the gap;
   a first positive lead coupled to an anode side of the first capacitor element and extending toward the anode end, and a second positive lead coupled to an anode side of the second capacitor element and extending toward the anode end;
   a bushing positioned within the interior area between the anode side of the first capacitor element and the cover and between the anode side of the second capacitor element and the cover, the bushing having a first opening aligned with the first positive lead and a second opening aligned with the second positive lead, wherein the first positive lead extends through the first opening, and the second positive lead extends through the second opening;

a surface mount anode terminal in electrical communication with the first positive lead and the second positive lead and insulated from the capacitor body; and a surface mount cathode terminal in electrical communication with the capacitor body.

2. The hermetically sealed polymer capacitor of claim 1, further comprising an anode insulator positioned along an outer surface of the capacitor body, the anode insulator having a lower portion extending along a lower side of the capacitor body, at least a portion of the surface mount anode terminal extending along at least a portion of the lower portion of the anode insulator, and at least a portion of the surface mount cathode terminal extending along at least a portion of the lower portion of the anode insulator.

3. The hermetically sealed polymer capacitor of claim 2, wherein the anode terminal and the cathode terminal are each generally L-shaped.

4. The hermetically sealed polymer capacitor of claim 1, wherein the capacitor body is sheathed in an insulator covering at least a portion of the capacitor body.

5. The hermetically sealed polymer capacitor of claim 4, wherein the cover comprises a first hole and a second hole, and further comprising a first glass to metal seal (GTMS) positioned in the first hole and a second glass to metal seal (GTMS) positioned in the second hole, the first positive lead received in the first GTMS and the second positive lead received in the second GTMS.

6. The hermetically sealed polymer capacitor of claim 5, wherein the first GTMS comprises a first metal tube insulated from the cover via glass and wherein the second GTMS comprises a second metal tube insulated from the cover via glass, and wherein the first positive lead is welded to the first metal tube, and wherein the second positive lead is welded to the second metal tube.

7. The hermetically sealed polymer capacitor of claim 1, wherein the first positive lead comprises a first anode wire extending from the first capacitor element, and wherein the second positive lead comprises a second anode wire extending from the second capacitor element.

8. The hermetically sealed polymer capacitor of claim 1, wherein the first positive lead comprises a first metal wire welded to a first anode wire extending from the first capacitor element, and wherein the second positive lead comprises a second metal wire welded to a second anode wire extending from the second capacitor element.

9. The hermetically sealed polymer capacitor of claim 7, further comprising a cross wire welded to and coupling the first anode wire and the second anode wire.

10. The hermetically sealed polymer capacitor of claim 1, wherein a moisture content within the capacitor body is less than approximately 25% relative humidity at approximately 20° C. to approximately 30° C.

11. A method of forming a hermetically sealed polymer capacitor, the method comprising:

forming a capacitor body having an interior area and a cathode end and an anode end, the capacitor body comprising a case having an opening at the anode end;

dispensing a quantity of conductive paste within the interior area in an uncured state, the conductive paste configured to harden in a cured state;

inserting a first capacitor element and a second capacitor element within the interior area and into contact with the conductive paste with a gap provided between the first capacitor element and the second capacitor element, wherein an anode side of the first capacitor element is coupled to a first positive lead configured to extend toward the anode end of the case and an anode side of the second capacitor element is coupled to a second positive lead configured to extend toward the anode end of the case, the conductive paste covering at least portions of the first and second capacitor elements, wherein at least a portion of the conductive paste is in contact with an inner surface of the case and a surface of the first capacitor element, at least a portion of the conductive paste is at least partially positioned between the inner surface of the case and a surface of the second capacitor element, and at least a portion of the conductive paste is at least partially positioned within the gap;

curing the conductive paste within the body to harden the conductive paste;

positioning a bushing within the interior area between the anode side of the first capacitor element, the anode side of the second capacitor element and a cover, the bushing having a first opening aligned with the first positive lead and a second opening aligned with the second positive lead, wherein the first positive lead extends through the first opening, and the second positive lead extends through the second opening;

welding the cover over the anode end of the case to form the capacitor body;

drying the capacitor body;

positioning a surface mount anode terminal in electrical communication with the first positive lead and the second positive lead and insulated from the capacitor body; and positioning a surface mount cathode terminal in electrical communication with the case.

12. The method of claim 11, further comprising an anode insulator positioned adjacent an outer surface of the capacitor body, the anode insulator having a lower portion extending along a lower side of the capacitor body, at least a portion of the surface mount anode terminal extending along at least a portion of the lower portion of the anode insulator, and at least a portion of the surface mount cathode terminal extending along at least a portion of the lower portion of the anode insulator.

13. The method of claim 12, wherein the anode terminal and the cathode terminal are each generally L-shaped.

14. The method of claim 11, wherein the capacitor body is sheathed in an insulator covering at least a portion of the capacitor.

15. The method of claim 14, wherein the cover comprises a first hole and a second hole, wherein a first glass to metal seal (GTMS) is positioned within the first hole and a second glass to metal seal (GTMS) is positioned within the second hole, the first positive lead received in the first GTMS, the second positive lead received in the second GTMS.

16. The method of claim 15, wherein the GTMS comprises a first metal tube and a second metal tube insulated from the cover via glass, and wherein the first positive lead is welded to the first metal tube, and wherein the second positive lead is welded to the second metal tube.

17. The method of claim 11, wherein the first positive lead comprises a first anode wire extending from the first capacitor element, and a second anode wire extending from the second capacitor element.

18. The method of claim 11, wherein the first positive lead comprises a first metal wire welded to a first anode wire extending from the first capacitor element, and a second metal wire welded to a second anode wire extending from the second capacitor element.

19. The method of claim 11, further comprising a cross wire coupling a first anode wire extending from the first capacitor element to the second anode wire extending from the second capacitor element.

20. The method of claim 11, wherein a moisture content within the capacitor body is less than approximately 25% relative humidity at approximately 20° C. to approximately 30° C.

* * * * *